(12) United States Patent
Ode et al.

(10) Patent No.: US 11,324,065 B2
(45) Date of Patent: May 3, 2022

(54) BASE STATION, WIRELESS TERMINAL, WIRELESS COMMUNICATION SYSTEM, AND WIRELESS COMMUNICATION METHOD

(71) Applicant: FUJITSU LIMITED, Kawasaki (JP)

(72) Inventors: Takayoshi Ode, Yokohama (JP); Shinichiro Aikawa, Yokohama (JP); Yoshihiro Kawasaki, Kawasaki (JP); Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 16/521,260

(22) Filed: Jul. 24, 2019

(65) Prior Publication Data

US 2019/0387567 A1   Dec. 19, 2019

Related U.S. Application Data

(63) Continuation of application No. PCT/JP2017/003455, filed on Jan. 31, 2017.

(51) Int. Cl.
*H04W 76/25* (2018.01)
*H04W 80/08* (2009.01)
(Continued)

(52) U.S. Cl.
CPC ............ *H04W 76/25* (2018.02); *H04W 80/08* (2013.01); *H04W 88/02* (2013.01); *H04W 88/08* (2013.01)

(58) Field of Classification Search
None
See application file for complete search history.

(56) References Cited

U.S. PATENT DOCUMENTS 10,334,657 B2 *   6/2019   Hong ................ H04W 52/0254
2014/0024378 A1   1/2014   Khude et al.
(Continued)

FOREIGN PATENT DOCUMENTS

JP   2016-515364 A   5/2016
JP   2016-519531 A   6/2016
(Continued)

OTHER PUBLICATIONS

Ericsson, Tdoc R2-162760, "Handling of inactive UEs", 3GPP TSG-RAN WG2 #93bis, Dubrovnik, Croatia, Apr. 11-15, 2016, Update: Apr. 2, 2016.
(Continued)

*Primary Examiner* — Otis L Thompson, Jr.
(74) *Attorney, Agent, or Firm* — Myers Wolin, LLC

(57) ABSTRACT

A base station includes a memory; a processor configured to transmit a wireless signal to a wireless terminal and to receive a wireless signal from the wireless terminal; and a controller configured to, while a radio link between the wireless terminal and the base station is disconnected, and an upper-layer connection between the base station and an upper-layer node is maintained wherein the wireless terminal uses the upper-layer connection for communication through the base station, in response to an event that one of first setting information for setting the radio link and second setting information for setting the upper-layer connection is changed, transmit setting information having been changed among the first setting information and the second setting information to the wireless terminal through the processor.

8 Claims, 13 Drawing Sheets

(51) Int. Cl.
*H04W 88/02* (2009.01)
*H04W 88/08* (2009.01)

(56) References Cited

U.S. PATENT DOCUMENTS

| | | |
|---|---|---|
| 2014/0315551 A1 | 10/2014 | Su et al. |
| 2016/0007332 A1* | 1/2016 | Futaki .................. H04W 76/15 |
| | | 370/329 |
| 2017/0055158 A1 | 2/2017 | Ogawa |
| 2018/0035342 A1 | 2/2018 | Fujishiro et al. |
| 2019/0166535 A1 | 5/2019 | Fujishiro et al. |
| 2019/0349818 A1* | 11/2019 | Li ...................... H04W 52/0229 |
| 2020/0162983 A1 | 5/2020 | Fujishiro et al. |
| 2020/0329455 A1* | 10/2020 | Ryu ...................... H04W 68/02 |
| 2020/0404570 A1* | 12/2020 | Wang ................... H04W 4/029 |

FOREIGN PATENT DOCUMENTS

| | | |
|---|---|---|
| WO | 2015/177935 A1 | 11/2015 |
| WO | 2016/163545 A1 | 10/2016 |

OTHER PUBLICATIONS

Sierra Wireless, R2-166059, "Transmission of Data Grant-Free in New State", 3GPP TSG-RAN WG2 #95bis, Kaohsiung, Taiwan, Oct. 10-14, 2016, Update:Oct. 1, 2016.
Samsung, R2-166060, "Design principles for the new RAN controlled state", 3GPP TSG-RAN WG2 #95bis, Kaohsiung, Taiwan, Oct. 10-14, 2016, Update:Sep. 30, 2016.
International Search Report issued for corresponding of International Application No. PCT/JP2017/003455 dated Apr. 4, 2017.
Written Opinion of The International Searching Authority of International Application No. PCT/JP2017/003455 dated Apr. 4, 2017 with English translation of the relevant part.
NTT Docomo, Inc, R2-167136, Revison of R2-164713, UE state transition diagram for NR, 3GPP TSG-RAN WG2 #95bis, Kaohsiung, Taiwan, Oct. 10-14, 2016 cited in ISR for No. PCT/JP2017/003455.
Ericsson,Tdoc R2-166920, Signalling flows for paging and resume for inactive state, 3GPP TSG-RAN WG2 #95bis, Kaohsiung, Taiwan, Oct. 10-14, 2016 cited in ISR for No. PCT/JP2017/003455.
Notice of Reasons for Refusal issued by the Japan Patent Office for corresponding Japanese Patent Application No. 2018-565118, dated Dec. 8, 2020 with full machine English translation.

* cited by examiner

BASE STATION, WIRELESS TERMINAL, WIRELESS COMMUNICATION SYSTEM, AND WIRELESS COMMUNICATION METHOD

CROSS-REFERENCE TO RELATED APPLICATIONS

This application is a continuation application of International Application PCT/JP2017/003455 filed on Jan. 31, 2017, and designated the U.S., the entire contents of which are incorporated herein by reference.

FIELD

The present disclosure relates to, for example, a base station, a wireless terminal, a wireless communication system, and a wireless communication method that execute wireless communication.

BACKGROUND

In wireless communication systems such as mobile communication systems, discontinuous reception functions (DRX) are adopted to reduce power consumption of wireless terminals. For example, in Long Term Evolution (LTE), which is one of the wireless communication standards for mobile communications, a wireless terminal wakes up at a time interval (e.g., a subframe) set in every cycle set in advance for each wireless terminal (called a "DRX cycle"). The wireless terminal demodulates and decodes information on wireless resource allocation (scheduling information) that is transmitted within the awake time interval. Then, the wireless terminal refers to the scheduling information and checks whether there is an incoming call addressed to the wireless terminal itself based on the presence or absence of resources allocated to the wireless terminal itself. Meanwhile, during a time period other than the set time interval, the wireless terminal turns off operations of parts that execute such a demodulation process and a decoding process among circuits that execute wireless communication processing, to reduce the power consumption.

Also, in a 3GPP working group considering specifications of the so-called fifth generation mobile communication system, a proposal has been made to add an inactive state as one of the Radio Resource Control (RRC) states so as to be capable of handling an inactive time period longer than a DRX cycle. Note that the fifth generation mobile communication system is a standard for mobile communications after LTE and LTE-Advanced.

In an inactive state, even in a time interval when the wireless terminal stops communication, a connection between a base station and an upper-layer node (referred to as an "upper-layer connection", below) (e.g., Context) is maintained so as not to be disconnected. On the other hand, a radio link between the base station and the wireless terminal is disconnected (see, for example, Non-Patent Documents 1-3).

Non-Patent Document 1: Tdoc R2-162760, Ericsson, Handling of active UEs, 3GPP TSG-RAN WG2 #93bis, Dubrovnik, Croatia, Apr. 11-15, 2016
Non-Patent Document 2: Tdoc R2-166059, Sierra Wireless, Transmission of Data Grant-Free in New State, 3GPP TSG-RAN WG2 #95bis, Kaohsiung, Taiwan, Oct. 10-14, 2016
Non-Patent Document 3: Tdoc R2-166060, Samsung, Design principles for the new RAN controlled state, 3GPP TSG-RAN WG2 #95bis, Kaohsiung, Taiwan, Oct. 10-14, 2016

With respect to the inactive state, a resume function has been proposed that allows a wireless terminal to omit a part of communication of control information when resuming communication, by having the wireless terminal store connection setting information for communicating through a base station so as to use the stored connection setting information when the wireless terminal resumes the communication. Connection setting information to be stored with respect to the resume function is managed in association with, for example, identification information (referred to as "resume ID", below). Therefore, when a wireless terminal is going to resume communication, the resume ID is transmitted between the wireless terminal and the base station so that the wireless terminal and the base station use the connection setting information associated with the same resume ID, so as to enable the wireless terminal to resume communication. Also, using the connection setting information and the resume ID reduces the communication traffic volume of control information required when resuming communication.

Therefore, introduction of the inactive state is expected to reduce the power consumption of devices that communicate, for example, once a day or less frequently, such as wireless terminals used in the Internet of Things (IoT).

However, while a wireless terminal is in an inactive state to stop communication, a situation may arise where the wireless terminal is required to change the connection setting information or the resume ID. In such a case, when the wireless terminal attempts to resume communication, communication may not be resumed even if using the stored connection setting information and resume ID.

SUMMARY

According to one embodiment, a base station includes a memory; a processor configured to transmit a wireless signal to a wireless terminal and to receive a wireless signal from the wireless terminal; and a controller configured to, while a radio link between the wireless terminal and the base station is disconnected, and an upper-layer connection between the base station and an upper-layer node is maintained wherein the wireless terminal uses the upper-layer connection for communication through the base station, in response to an event that one of first setting information for setting the radio link and second setting information for setting the upper-layer connection is changed, transmit setting information having been changed among the first setting information and the second setting information to the wireless terminal through the processor.

The object and advantages in the present embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

Figure 1:
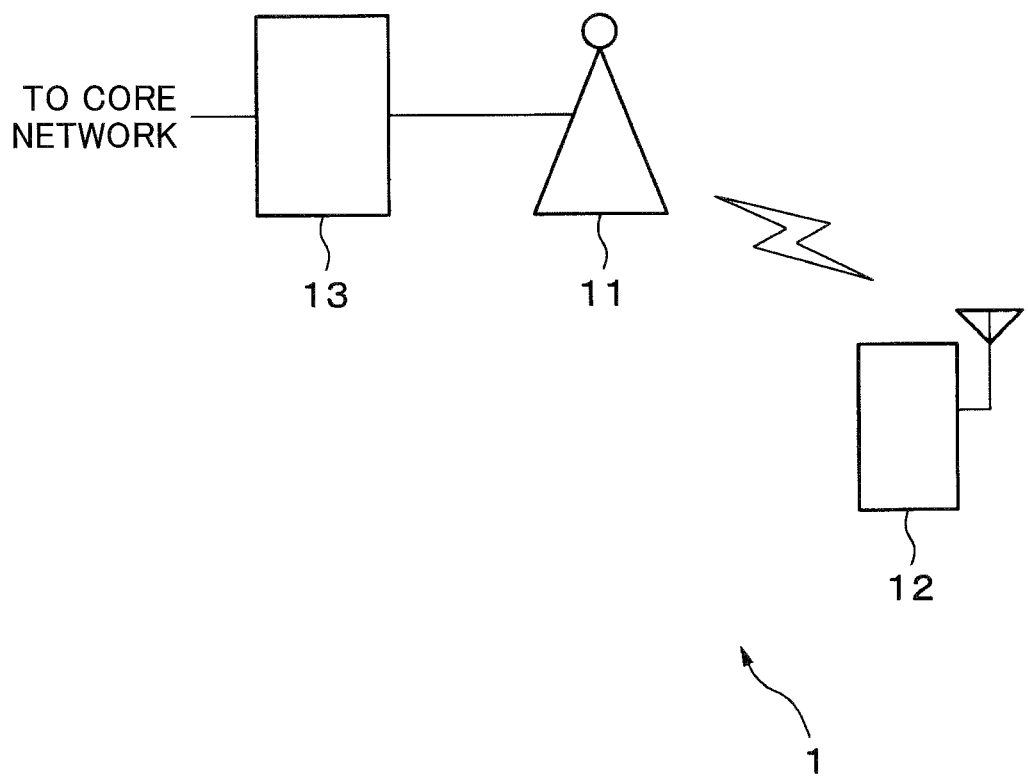
FIG. 1 is a schematic configuration diagram of a wireless communication system according to one embodiment.

In the following, a wireless communication system; and a base station, a wireless terminal, and a wireless communication method used in the wireless communication system will be described with reference to the drawings. This wireless communication system supports the resume function, and separates connection setting information maintained by the resume function such that setting information on upper-layer connections is distinguishable from setting information on radio links, and manages each item of the setting information in association with identification information. Then, when it becomes necessary to change the setting information or the identification information with respect to one of the connections while the corresponding wireless terminal suspends communication after transitioning to an inactive state, the base station transmits contents to be changed of the connection setting information to the wireless terminal, or requests the wireless terminal to reset the connection setting information.

This enables the wireless communication system to change information on the connection settings maintained for the wireless terminal while the wireless terminal suspends communication.

Note that in the following, connection setting information on a radio link between a base station and a wireless terminal will be referred to as "radio link setting information". Also, connection setting information on an upper-layer connection used by a wireless terminal to communicate through a base station will be referred to as "upper-layer connection setting information". In addition, identification information associated with radio link setting information will be referred to as a "resume1 ID", and identification information associated with upper-layer connection setting information will be referred to as a "resume2 ID". Also, a resume1 ID and a resume2 ID may be collectively referred to as "resume ID". Further, in the following, radio link setting information and upper-layer connection setting information may be collectively referred to as "connection setting information".

The radio link setting information includes, for example, information specified in RRC Connection Configuration such as information on channel settings and information on applicability of multiple-input and multiple-output (MIMO). Also, part of system information may be included in the radio link setting information. For example, the radio link setting information may include, as part of system information, information on wireless resources such as the frequency bandwidth, number of sub-carriers, and sub-carrier spacing. Further, filtered Orthogonal Frequency Division Multiplexing (f-OFDM), where different sub-carrier spacing may co-exist in a same signal and sub-carriers having different sub-carrier spacing may be separated using digital filters, may be adopted in wireless communication between a wireless terminal and a base station. In this case, the radio link setting information may include, as part of the system information, the frequency, frequency bandwidth, sub-carrier spacing, symbol length, adjacent cell information, and cell selection parameters, to be used. Furthermore, the radio link setting information may include the encoding rate, encoding scheme, and modulation scheme.

On the other hand, the upper-layer connection setting information includes, for example, information related to context, information on Quality of Service (QoS) settings, and information on bearer settings or flow settings.

Note that in the present specification a Node B, eNode B, gNode B, access point, or the like is an example of a base station. Further, a mobile station, mobile terminal, or User Equipment (UE) is an example of a wireless terminal.

FIG. 1 is a schematic configuration diagram of a wireless communication system according to one embodiment. The wireless communication system 1 includes a base station 11, a wireless terminal 12, and an upper-layer node 13. The base station 11 and the wireless terminal 12 transmit signals to each other by wireless communication. Note that the number of base stations 11 included in the wireless communication system 1 is not limited to one, and the wireless communication system 1 may include multiple base stations 11. Similarly, the wireless communication system 1 may include multiple wireless terminals 12. Also, the wireless terminal 12 may be a mobile terminal or a fixed communication device.

The base station 11 relays communication between the wireless terminal 12 and the upper-layer node 13. For that purpose, the base station 11 is connected to the upper-layer node 13 according to a predetermined communication standard defined for communication between the upper-layer node 13 and the base station 11, for example, the S1 interface. The base station 11 may also be connected to another base station according to a predetermined communication standard defined for communication between base stations, for example, the X2 interface.

The base station 11 sets one or more cells. For example, if the wireless terminal 12 is located in one of the cells set by the base station 11, the wireless terminal 12 can communicate wirelessly with the base station 11. Then, the base station 11 executes a procedure of setting up a radio link and a procedure of setting up an upper-layer connection, such as a random access procedure, with the wireless terminal 12 that is ready to execute wireless communication. Thereafter, the base station 11 receives a communication signal addressed to the wireless terminal 12 from the core network through the upper-layer node 13, to transmit it to the wireless terminal 12 as a downlink wireless signal. The base station 11 also receives an uplink wireless signal from the wireless terminal 12 and extracts a communication signal to another communication device (not illustrated) included in the wireless signal, to transmit the communication signal to the upper-layer node 13.

Also, in order to make the resume function usable by the wireless terminal 12, the base station 11 attaches a resume ID to each of the upper-layer connection setting information and the radio link setting information with respect to the wireless terminal 12. Then, the base station 11 stores the upper-layer connection setting information and the radio link setting information together with the corresponding resume IDs. Further, the base station 11 transmits a notice of the radio link setting information and the resume1 ID to the wireless terminal 12 while the wireless terminal 12 continues wireless communication with the base station 11, namely, while the wireless terminal 12 is in a connected state. Thereafter, when it becomes necessary to change one of the radio link setting information and the upper-layer connection setting information, or one of the resume1 ID and the resume2 ID, the base station 11 executes a resume setting change process. Note that resume setting change processes will be described in detail later.

The wireless terminal 12 is a wireless terminal that supports the resume function, and, for example, after having the upper-layer connection and the radio link set in a connected state, transitions into an inactive state to stop communication. In other words, even if the radio link between the wireless terminal 12 and the base station 11 is disconnected, the upper-layer connection with respect to the wireless terminal 12 maintains a connected state. Also, the radio link setting information and the upper-layer connection setting information for the wireless terminal 12 are maintained and managed on the base station 11. Then, when a cyclic (e.g., several hours, several days, one month, etc.) or specific event occurs, the wireless terminal 12 uses the stored radio link setup information and upper-layer connection setup information to reconnect to the radio link, so as to resume communication with the other communication device (not illustrated).

The upper-layer node 13 includes, for example, a Serving Gateway (S-GW), a Mobility Management Entity (MME), and a Packet data network gateway (P-GW) to relay communication between the core network and the base station 11. Further, the upper-layer node 13 executes control of registration of the position of the wireless terminal 12 and handover between base stations, and executes control of QoS, billing, and the like. The upper-layer node 13 also executes control of the upper-layer connection, such as establishing or deleting a bearer.

In the following, resume setting change processes will be described in detail. For example, in the case where a service provided to a wireless terminal is changed, added, or deleted, or in the case where the load state of the base station differs between the time of connection setting and the time of communication resumption, the connection setting information or the resume ID may need to be changed. Also, in the case where a cell that is connected to or is waiting for communication with (the latter is also expressed as "is camped on by", below) the wireless terminal differs between the time of connection setting and the time of communication resumption, it may be necessary to change the connection setting information or the resume ID. In such a case, a resume setting change process is executed.

The base station 11 executes a resume setting change process for the wireless terminal 12 that is in an inactive state in the following four cases:

(1) a case where the resume1 ID or the wireless connection setting cannot be maintained;
(2) a case where the cell that is connected to or camped on by the wireless terminal 12 is changed to a cell provided by another base station connected to the upper-layer node 13 connected to the base station 11;
(3) a case where the resume2 ID or the upper-layer connection setting cannot be maintained; and
(4) a case where the cell that is connected to or camped on by the wireless terminal 12 is changed to a cell provided by another base station connected to an upper-layer node that is different from the upper-layer node 13 connected to the base station 11.

For each of the cases of (1) to (4), the base station 11 executes a resume setting change process according to one of different sequences for the following four cases:

(a) a case where the resume ID can be maintained for the connection setting information to be changed, and the base station 11 transmits a notice of the changed contents in the settings to the wireless terminal 12;
(b1) a case where the resume ID cannot be maintained with respect to the connection setting information to be changed, and the base station 11 transmits a notice of the resume ID and the changed contents in settings to the wireless terminal 12.
(b2) a case where the resume ID cannot be maintained with respect to the connection setting information to be changed, and the base station 11 resets the connection for the wireless terminal 12 or requests the wireless terminal 12 to reset the connection.
(b3) a case where the resume ID cannot be maintained with respect to the connection setting information to be changed, and the base station 11 resets the radio link for the wireless terminal 12 (i.e., executes random access again) or requests the wireless terminal 12 to reset the radio link.

Note that in the case of (1), cases falling under (a) to (b3) are, for example, as follows. Note that the following cases are merely examples, and cases falling under (a) to (b3) are not limited to the following cases.

Case falling under (a):
a change in the modulation scheme, encoding scheme, or coding rate.

Case falling under (b1):
an occurrence of a situation where the resume ID assigned to the wireless terminal 12 becomes a duplicate of a resume ID assigned to another wireless terminal, or a change in a service provided for wireless terminals located within a cell provided by the base station 11; or
a change in the modulation scheme, encoding scheme, or coding rate accompanying such an occurrence.

Case falling under (b2):
a change in QoS with respect to the wireless terminal 12.

Case falling under (b3)
a change in settings with respect to the physical layer, e.g., the symbol length, sub-carrier, etc.

Figure 2:
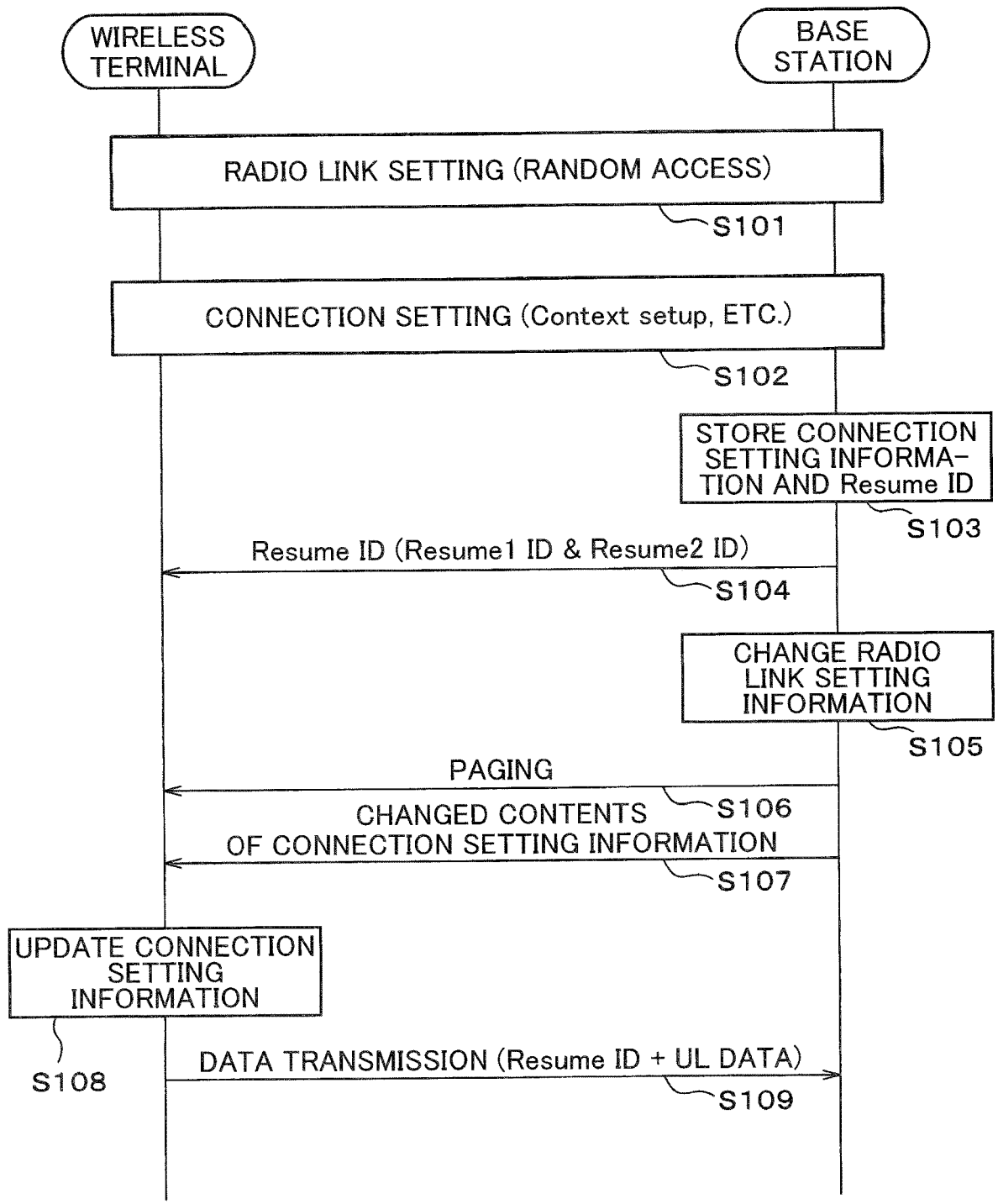
FIG. 2 is a sequence chart of a wireless communication process that includes a resume setting change process according to an example.

FIG. 2 is a sequence chart of a wireless communication process that includes a resume setting change process in the case of (1) and (a). The base station 11 and the wireless terminal 12 execute the radio link setting process, for example, according to a random access procedure (Step S101). The base station 11 and the wireless terminal 12 further execute a line setting process that includes upper-layer connection settings such as Context setup, together with the upper-layer node 13 (Step S102).

The base station 11 assigns a resume1 ID to the radio link setting information for the wireless terminal 12; assigns a resume2 ID to the upper-layer connection setting information; and stores the resume1 ID and resume2 ID together with the connection setting information (Step S103). Note that the base station 11 may assign a different resume ID for each wireless terminal or may assign a different resume ID for each group of wireless terminals that receive the same service. Alternatively, the base station 11 may assign a different resume ID for each cell in which the wireless terminals 12 are located. Further, the base station 11 may use different methods of assigning the resume ID described above for the resume1 ID and resume2 ID. Then, the base station 11 transmits a notice of the resume ID (including the resume1 ID and the resume2 ID) to the wireless terminal 12 (Step S104). At this time, the base station 11 may transmit the notice of the resume ID, for example, through a physical downlink control channel (PDCCH) or a physical downlink shared channel (PDSCH). Also, the base station 11 may transmit the upper-layer connection setting information and the resume2 ID to the upper-layer node 13. The wireless terminal 12 stores the transmitted notice of the resume ID together with the connection setting information set at Steps S101 and S102.

Thereafter, after the wireless terminal 12 has transitioned from a connected state to an inactive state, if a situation that requires a change in the radio link setting information arises, the base station 11 changes the radio link setting information. Further, if the change in the upper-layer connection setting information also necessitates changing the radio link setting information, the base station 11 changes the upper-layer connection setting information. Then, the base station 11 stores the changed connection setting information together with the resume ID assigned to the wireless terminal 12 (Step S105).

After having changed the connection setting information, the base station 11 executes a paging process with respect to the wireless terminal 12 to call the wireless terminal 12 (Step S106). After having called the wireless terminal 12, the base station 11 transmits a notice of the changed contents in the connection setting information to the wireless terminal 12 (Step S107). The wireless terminal 12 stores the connection setting information updated with the transmitted change together with the resume ID (Step S108).

Thereafter, when resuming communication in an inactive state, the wireless terminal 12 reconnects to the radio link using the stored connection setting information, and transmits to the base station 11 uplink data to the other communication device together with the resume ID (Step S109). At this time, the wireless terminal 12 and the base station 11 may execute connection setting in the event of communication resumption, for example, according to the method described in Non-Patent Document 1. Then, the base station 11 and the wireless terminal 12 terminate the wireless communication process. Note that in this sequence, Steps S105 to S108 are included in the resume setting change process.

Also the paging process at Step S106 may be omitted. In this case, while the wireless terminal 12 is in a connected state, the base station 11 and the wireless terminal 12 set a period during which the wireless terminal 12 is awake while the wireless terminal 12 is otherwise in an inactive state, and the resources to be used during the period. Then, the base station 11 may use the set resources to transmit a notice of the changed connection setting information to the wireless terminal 12 within the period during which the wireless terminal 12 is awake. Note that in sequences of resume setting change processes for other cases described below, the paging process may also be omitted unless otherwise mentioned.

Figure 3:
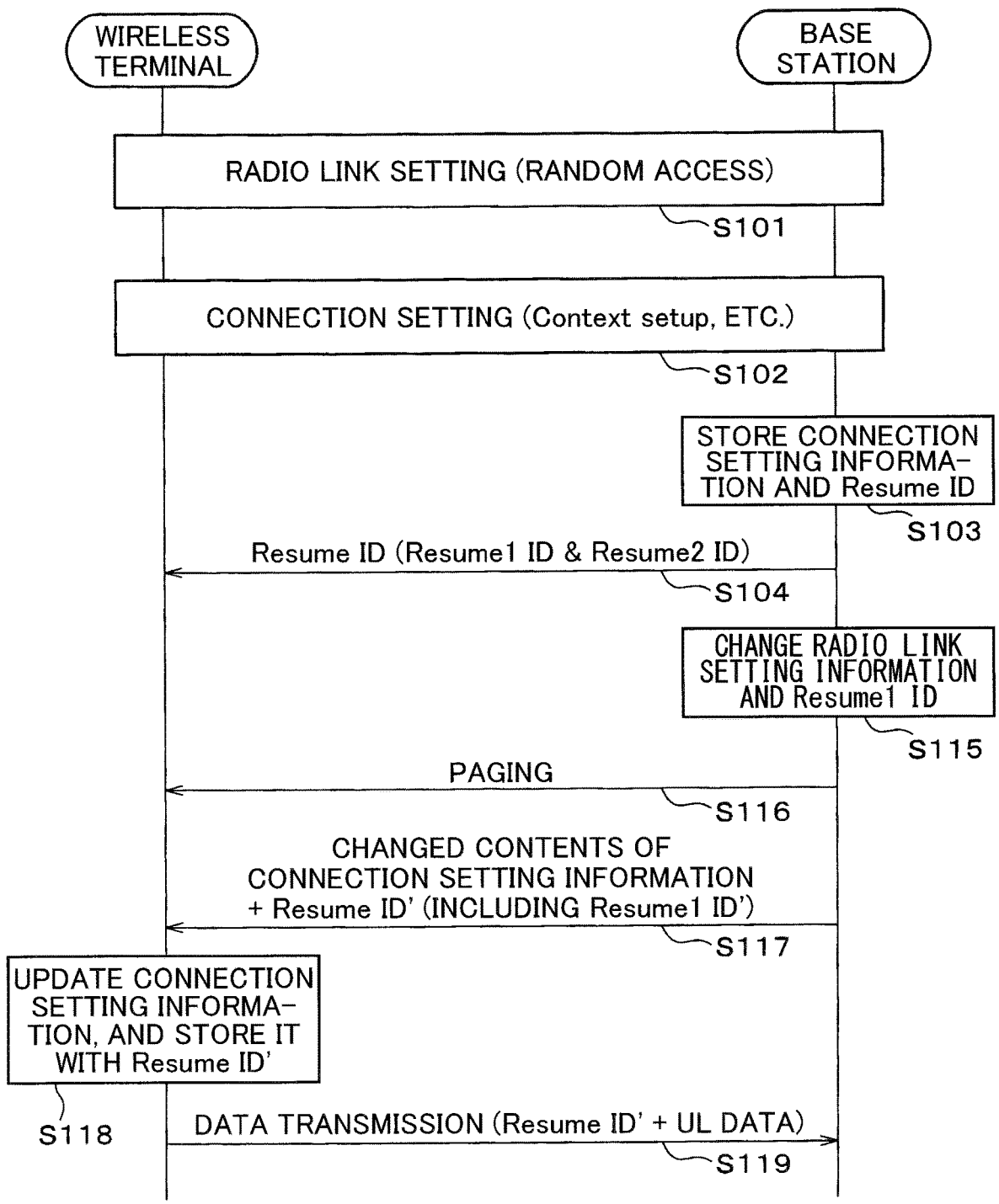
FIG. 3 is a sequence chart of a wireless communication process that includes a resume setting change process according to another example.

FIG. 3 is a sequence chart of a wireless communication process that includes a resume setting change process in the case of (1) and (b1). Note that the sequence illustrated in FIG. 3 differs from the sequence illustrated in FIG. 2 in a process of Steps S115 and thereafter. Therefore, in the following, the process of Steps S115 and thereafter will be described.

After Step S104, after the wireless terminal 12 has transitioned from a connected state to an inactive state, if a situation arises where it is necessary to change the radio link setting information and the resume1 ID, the base station 11 changes the radio link setting information. Further, the base station 11 changes the resume1 ID assigned to the wireless terminal 12 to a resume1 ID'. Further, in the case where the change of the radio link setting information also necessitates changing the upper-layer connection setting information, the base station 11 also changes the upper-layer connection setting information. In the case where it is further necessary to change the resume2 ID, the base station 11 also changes the resume2 ID. Then, the base station 11 stores the changed connection setting information together with the resume ID' after the change (including at least the resume1 ID') (Step S115).

After having changed the connection setting information and the resume ID, the base station 11 executes a paging process with respect to the wireless terminal 12 to call the wireless terminal 12 (Step S116). After having called the wireless terminal 12, the base station 11 transmits a notice of the changed contents in the connection setting information and the resume ID' after the change to the wireless terminal 12 (Step S117). The wireless terminal 12 updates the connection setting information with the transmitted changed contents and stores the updated connection setting information together with the resume ID' after the change (Step S118).

Thereafter, when resuming communication in an inactive state, the wireless terminal 12 reconnects to the radio link using the stored connection setting information, and transmits to the base station 11 uplink data to the other communication device together with the resume ID' after the change (Step S119). At this time, the wireless terminal 12 and the base station 11 may execute connection setting in the event of communication resumption, for example, according to the method described in Non-Patent Document 1. Then, the base station 11 and the wireless terminal 12 terminate the wireless communication process. Note that in this sequence, Steps S115 to S118 are included in the resume setting change process.

Figure 4:
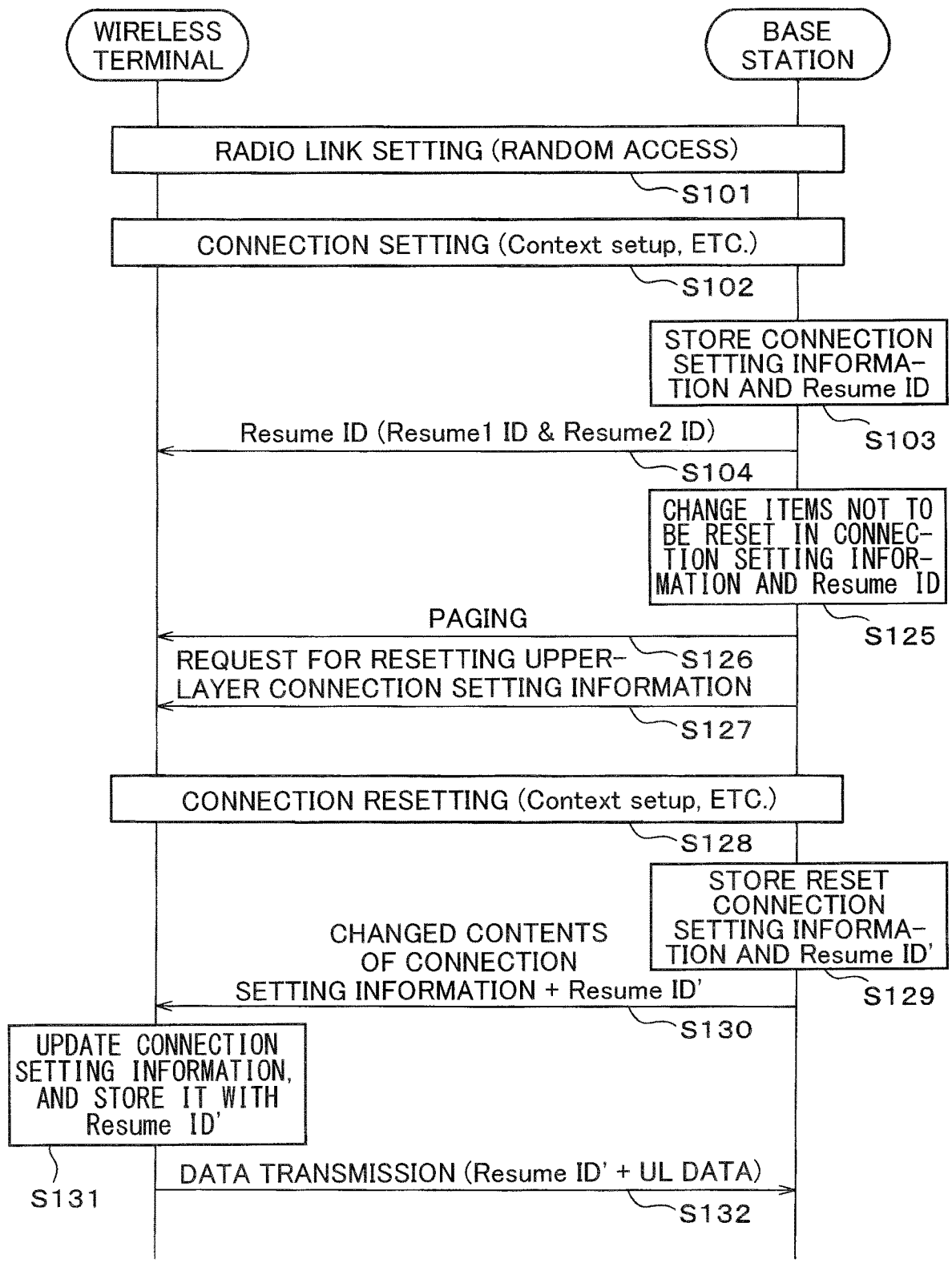
FIG. 4 is a sequence chart of a wireless communication process that includes a resume setting change process according to another example.

FIG. 4 is a sequence chart of a wireless communication process that includes a resume setting change process in the case of (1) and (b2). Note that the sequence illustrated in FIG. 4 differs from the sequence illustrated in FIG. 2 in a process of Steps S125 and thereafter. Therefore, in the following, the process of Steps S125 and thereafter will be described.

After Step S104, after the wireless terminal 12 has transitioned from a connected state to an inactive state, assume that a situation arises where it is necessary to change the radio link setting information. Assume further that the change in the radio link setting information necessitates resetting at least a part of the upper-layer connection setting with the wireless terminal 12, and necessitates changing the resume ID. In this case, the base station 11 changes the radio link setting information and changes information items that do not need to be reset in the upper-layer connection setting information. Furthermore, the base station 11 changes the resume1 ID assigned to the wireless terminal 12 to a resume1 ID'. Also, the base station 11 may change the resume2 ID assigned to the wireless terminal 12 to a resume2 ID'. Then, the base station 11 stores the changed connection setting information together with the resume ID' after the change (Step S125).

After having changed the connection setting information and the resume ID, the base station 11 executes a paging process with respect to the wireless terminal 12 to call the wireless terminal 12 (Step S126). After having called the wireless terminal 12, the base station 11 requests the wireless terminal 12 to reset the upper-layer connection setting information (Step S127). Then, the base station 11 and the wireless terminal 12 execute again a connection setting process that includes upper-layer connection settings such as Context setup, to change the upper-layer connection setting information (Step S128). Then, the base station 11 stores the changed upper-layer connection setting information together with the resume2 ID or the resume2 ID' after the change (Step S129). In addition, the base station 11 may transmit the changed upper-layer connection setting information and resume2 ID' to the upper-layer node 13.

Then, the base station 11 transmits a notice of the resume ID' after the change and the changed contents in the radio link setting information to the wireless terminal 12 (Step S130). The wireless terminal 12 updates the radio link setting information according to the transmitted changed contents and stores the updated radio link setting information and the reset upper-layer connection setting information together with the transmitted resume ID' after the change (Step S131).

Thereafter, when resuming communication in an inactive state, the wireless terminal 12 reconnects to the radio link using the stored connection setting information, and transmits to the base station 11 uplink data to the other communication device together with the resume ID' (Step S132). At this time, the wireless terminal 12 and the base station 11 may execute connection setting in the event of communication resumption, for example, according to the method described in Non-Patent Document 1. Then, the base station 11 and the wireless terminal 12 terminate the wireless communication process. Note that in this sequence, Steps S125 to S131 are included in the resume setting change process.

Figure 5:
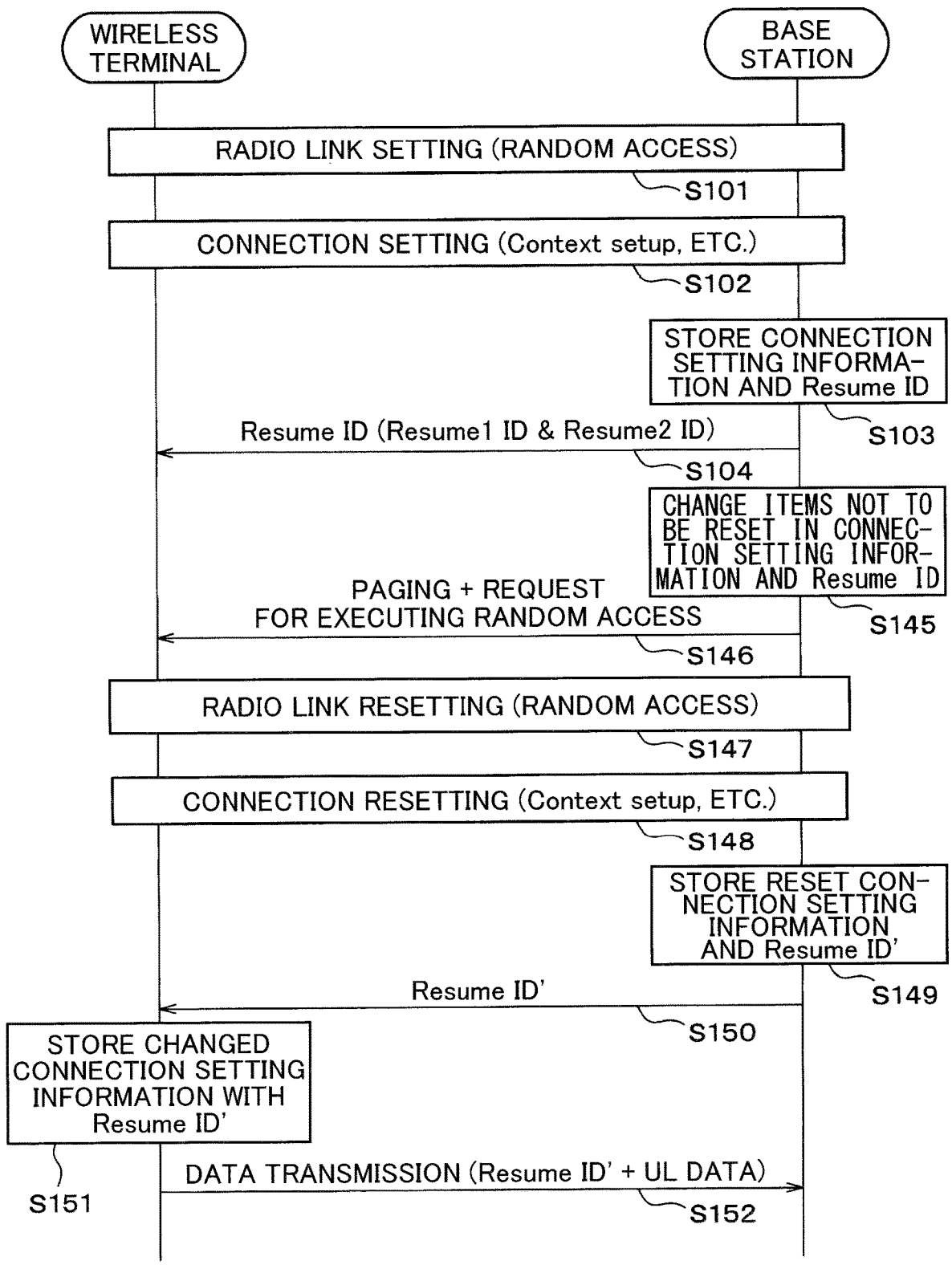
FIG. 5 is a sequence chart of a wireless communication process that includes a resume setting change process according to another example.

FIG. 5 is a sequence chart of a wireless communication process that includes a resume setting change process in the case of (1) and (b3). Note that the sequence illustrated in FIG. 5 differs from the sequence illustrated in FIG. 2 in a process of Steps S145 and thereafter. Therefore, in the following, the process of Steps S145 and thereafter will be described.

After Step S104, after the wireless terminal 12 has transitioned from a connected state to an inactive state, assume that a situation arises where it is necessary to reset the radio link setting information and to change the resume ID. In this case, the base station 11 changes information items that do not need to be reset in the radio link setting information, such as the modulation scheme, encoding scheme, encoding rate, or the like. Furthermore, the base station 11 changes the resume1 ID assigned to the wireless terminal 12 to a resume1 ID'. If this change also requires a change in the upper-layer connection setting information and the resume2 ID, the base station 11 also changes the upper-layer connection setting information and the resume2 ID. Then, the base station 11 stores the changed connection setting information together with the resume ID' after the change (Step S145).

After having changed the connection setting information and the resume ID, the base station 11 executes a paging process with respect to the wireless terminal 12 to call the wireless terminal 12, and to request the wireless terminal 12 to execute random access (Step S146). At this time, the base station 11 requests the wireless terminal 12 to execute paging and random access, by using the radio link setup information before the change. Alternatively, the base station 11 may request the wireless terminal 12 to execute paging and the like, by using radio link setting information that is close enough to the radio link setting information before the change such that the wireless terminal 12 can receive the request for paging and executing random access by using the radio link setting information before the change.

After the request for executing random access has been made, the base station and the wireless terminal 12 execute the radio link setting process again according to a random access procedure. Further, the base station 11 and the wireless terminal 12 execute again a connection setting process that includes upper-layer connection settings such as Context setup, to change the upper-layer connection setting (Step S148). Note that if none of the information items that need to be reset is included in the upper-layer connection setting information, the process of Step S148 may be omitted. Then, the base station 11 stores the changed connection setting information together with the resume ID' after the change (Step S149). In addition, the base station 11 may transmit the changed upper-layer connection setting information and the resume2 ID' after the change to the upper-layer node 13.

Then, the base station 11 transmits a notice of the resume ID' after the change to the wireless terminal 12 (Step S150). The wireless terminal 12 stores the transmitted resume ID' after the change together with the changed connection setting information (Step S151).

Thereafter, when resuming communication in an inactive state, the wireless terminal 12 reconnects to the radio link using the stored connection setting information, and transmits to the base station 11 uplink data to the other communication device together with the resume ID' after the change (Step S152). At this time, the wireless terminal 12 and the base station 11 may execute connection setting in the event of communication resumption, for example, according to the method described in Non-Patent Document 1. Then, the base station 11 and the wireless terminal 12 terminate the wireless communication process. Note that in this sequence, Steps S145 to S151 are included in the resume setting change process.

Next, a resume setting change process for the case of (2), namely, the case where the cell that is connected to or camped on by the wireless terminal 12 is changed to a cell provided by another base station connected to the upper-layer node 13 connected to the base station 11, will be described.

The case of (2) occurs, for example, while the wireless terminal 12 is connected to the base station 11, when the wireless terminal 12 transmits a notice to the base station 11 of changing the connection destination to another base station, or when the base station 11 determines to change the destination of the wireless terminal 12 to another base station. In particular, in the latter case, the base station 11 determines to change the destination of the wireless terminal 12 to another base station, for example, when the wireless terminal 12 moves. In this case, for example, the base station 11 determines whether to change the connection destination of the wireless terminal 12, based on information on radio link quality included in measurement reports received from the wireless terminal 12 in the past. Then, once having determined to change the connection destination, the base station 11 transmits a notice of the other base station as the connection destination after the change, to the wireless terminal 12. The base station 11 may also determine to change the destination of the wireless terminal 12 to another base station, when a change occurs in the camped-on cell due to addition, change, or deletion of a service given to and received by the wireless terminal 12. Furthermore, in order to distribute the load of the base station 11, the base station 11 may determine to change the destination of the wireless terminal 12 to another base station.

Further, if the change in a service provided by the base station 11 necessitates changing the cell, the base station 11 may execute a resume setting change process for every wireless terminal that receives the service, according to a sequence illustrated in FIG. 6 or FIG. 7 below.

In the case of (2), the base station 11 transmits a notice of the upper-layer connection setting information, the radio link setting information, and the resume ID with respect to the wireless terminal 12 to another base station as the changed connection destination (referred to as a "target base station", below). Then, the target base station determines whether or not the transmitted upper-layer connection setting information, radio link setting information, and resume ID can be maintained, and if these can be maintained, transmits a notice of the maintainability to the wireless terminal 12 through the base station 11.

Figure 6:
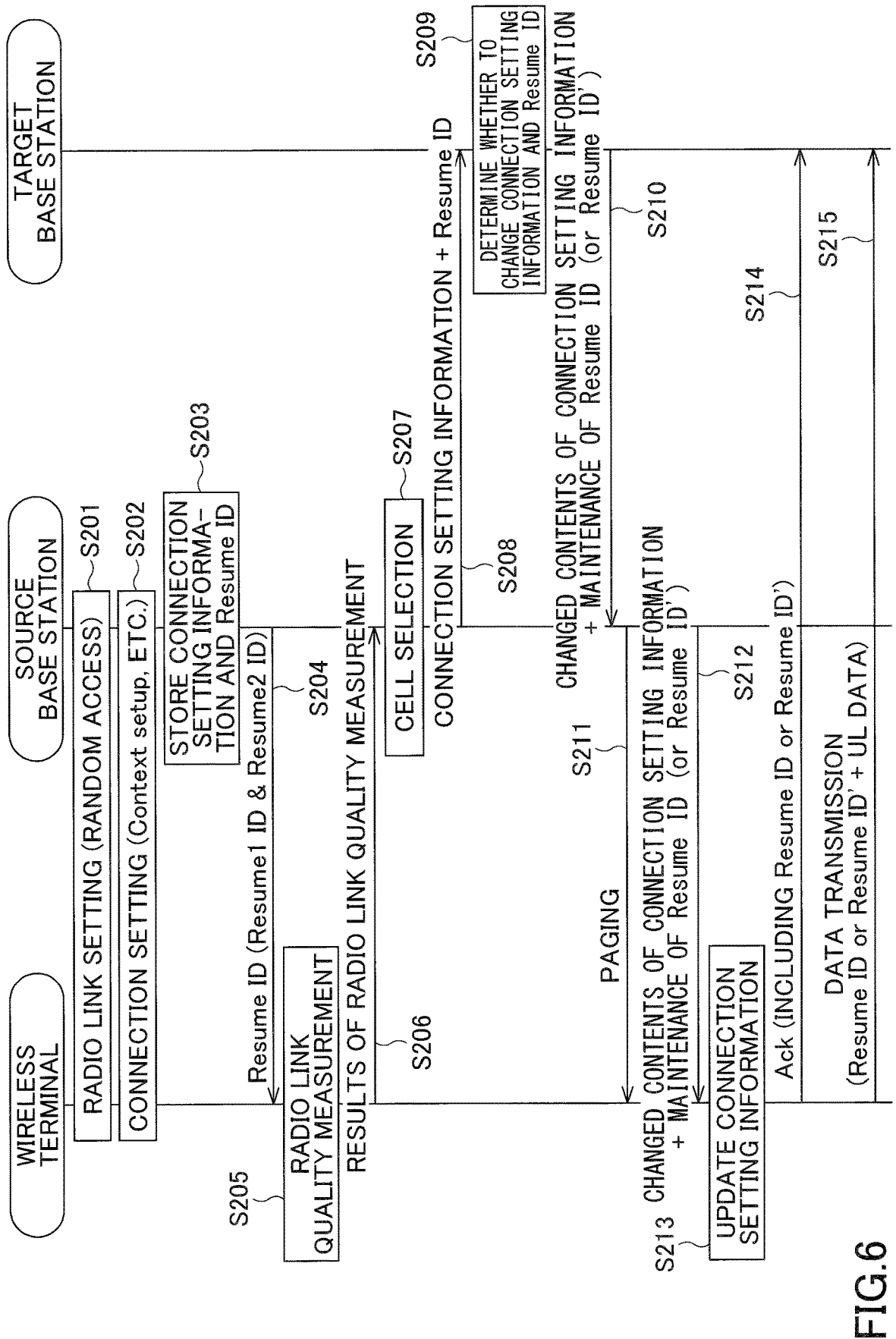
FIG. 6 is a sequence chart of a wireless communication process that includes a resume setting change process according to another example.

FIG. 6 is a sequence chart of a wireless communication process that includes a resume setting change process in the case of (2) and (a). Note that in the following, a base station connected to the wireless terminal 12 for which the resume setting has been executed first (e.g., the base station 11) will be referred to as the "source base station". The source base station and the wireless terminal 12 execute a radio link setting process, for example, according to a random access procedure (Step S201). Further, the source base station and the wireless terminal 12 together with the upper-layer node 13 execute a connection setting process that includes upper-layer connection settings such as Context setup (Step S202).

The source base station assigns a resume1 ID to the radio link setting information for the wireless terminal 12; assigns a resume2 ID to the upper-layer connection setting information; and stores the resume1 ID and resume2 ID together with the connection setting information (Step S203). Note that the source base station may assign a different resume ID for each wireless terminal or may assign a different resume ID for each group of wireless terminals that receive the same service. Alternatively, the source base station may assign a different resume ID for each cell in which the wireless terminals 12 are located. Further, the source base station may use different methods of assigning the resume ID described above for the resume1 ID and resume2 ID. Then, the source base station then transmits a notice of the resume ID to the wireless terminal 12 (Step S204). In addition, the source base station may transmit the upper-layer connection setting information and the resume2 ID to the upper-layer node 13.

The wireless terminal 12 measures radio link quality (e.g., signal-to-noise ratio or signal-to-interference and noise ratio), not only for a cell used for connection to the source base station, but also for cells provided by the other base stations (Step S205). Then, the wireless terminal 12 transmits a measurement report that includes results of the radio link quality measurement to the source base station (Step S206).

After the wireless terminal 12 has transitioned from a connected state to an inactive state, if a situation arises where it is necessary to change the cell that is connected to or camped on by the wireless terminal 12, the source base station selects a cell that is to be connected to or camped on by the wireless terminal 12 (Step S207). At this time, the source base station may, for example, refer to the results of the radio link quality measurement received from the wireless terminal 12, to select, for example, a cell with the best radio link quality or a cell with the radio link quality satisfying a predetermined condition from among the cells as the cell to be connected. Then, the source base station transmits a notice of the radio link setting information, the resume1 ID, the upper-layer connection setting information, and the resume2 ID with respect to the wireless terminal 12, to the target base station that provides the cell as the changed connection destination (Step S208). Note that the transmission of the connection setting information, the resume ID, and the like between the source base station and the target base station may be executed, for example, through a communication line compliant with the X2 interface, without going through the upper-layer node 13.

The target base station determines whether or not it is necessary to change the radio link setting, the upper-layer connection setting, and the resume ID, and executes necessary changes (Step S209). Then, in this example, the target base station transmits a notice of the changed contents in the connection setting information and the maintenance of the resume ID to the source base station (Step S210). Note that in the case where there is no change in the connection setting information, the target base station simply needs to transmit a notice of the no change and maintenance of the resume ID to the source base station.

In response to receiving the notice of the changed contents in the connection setting information and the maintenance of the resume ID, the source base station executes a paging process with respect to the wireless terminal 12 to call the wireless terminal 12 (Step S211). After having called the wireless terminal 12, the source base station transmits a notice of the changed contents in the connection setting information and the maintenance of the resume ID to the wireless terminal 12 (Step S212). Note that the radio link setting information to be transmitted may include information on a cell that is provided by the target base station and is to be connected to or camped on by the wireless terminal 12.

Then, the wireless terminal 12 updates the connection setting information according to the transmitted changed contents and stores it together with the resume ID (Step S213). Also, the wireless terminal 12 transmits an Ack signal acknowledging that the connection setting information has been changed, to the target base station by using the changed connection setting information (Step S214). Note that the Ack signal includes, for example, the resume ID. The Ack signal may further include the changed contents in the connection setting information or the changed connection setting information received by the wireless terminal 12.

Thereafter, when resuming communication in an inactive state, the wireless terminal 12 reconnects to the radio link using the stored connection setting information, and transmits to the target base station uplink data to the other communication device together with the resume ID (Step S215). At this time, the wireless terminal 12 and the target base station may execute connection setting in the event of communication resumption, for example, according to the method described in Non-Patent Document 1. Then, the source base station, the target base station, and the wireless terminal 12 terminate the wireless communication process. Note that in this sequence, Steps S207 to S214 are included in the resume setting change process. Also, instead of Steps S205 to S207, the wireless terminal 12 may determine to change the destination cell, select the changed destination cell, and transmit a notice of the identification information of the selected cell to the source base station. Further, the process of Step S214 may be omitted.

Also, in the case of (2) and (b1), a resume setting change process may be executed according to substantially the same sequence as illustrated in FIG. 6. In this case, if the target base station determines at Step S209 that it is necessary to change the resume ID, at Step S210, the target base station simply needs to transmit a notice of the changed contents in the connection setting information together with the resume ID' after the change (including at least the resume1 ID' after the change) to the source base station. Similarly, at Step S212, the source base station simply needs to transmit a notice of the changed connection setting information and the resume ID' after the change to the wireless terminal 12. Then, the wireless terminal 12 generates at Step S214 an Ack signal that includes the resume ID' after the change, and at Step S215, reconnects to the radio link using the changed connection setting information, to transmit the uplink data together with the resume ID' after the change to the target base station.

Figure 7:
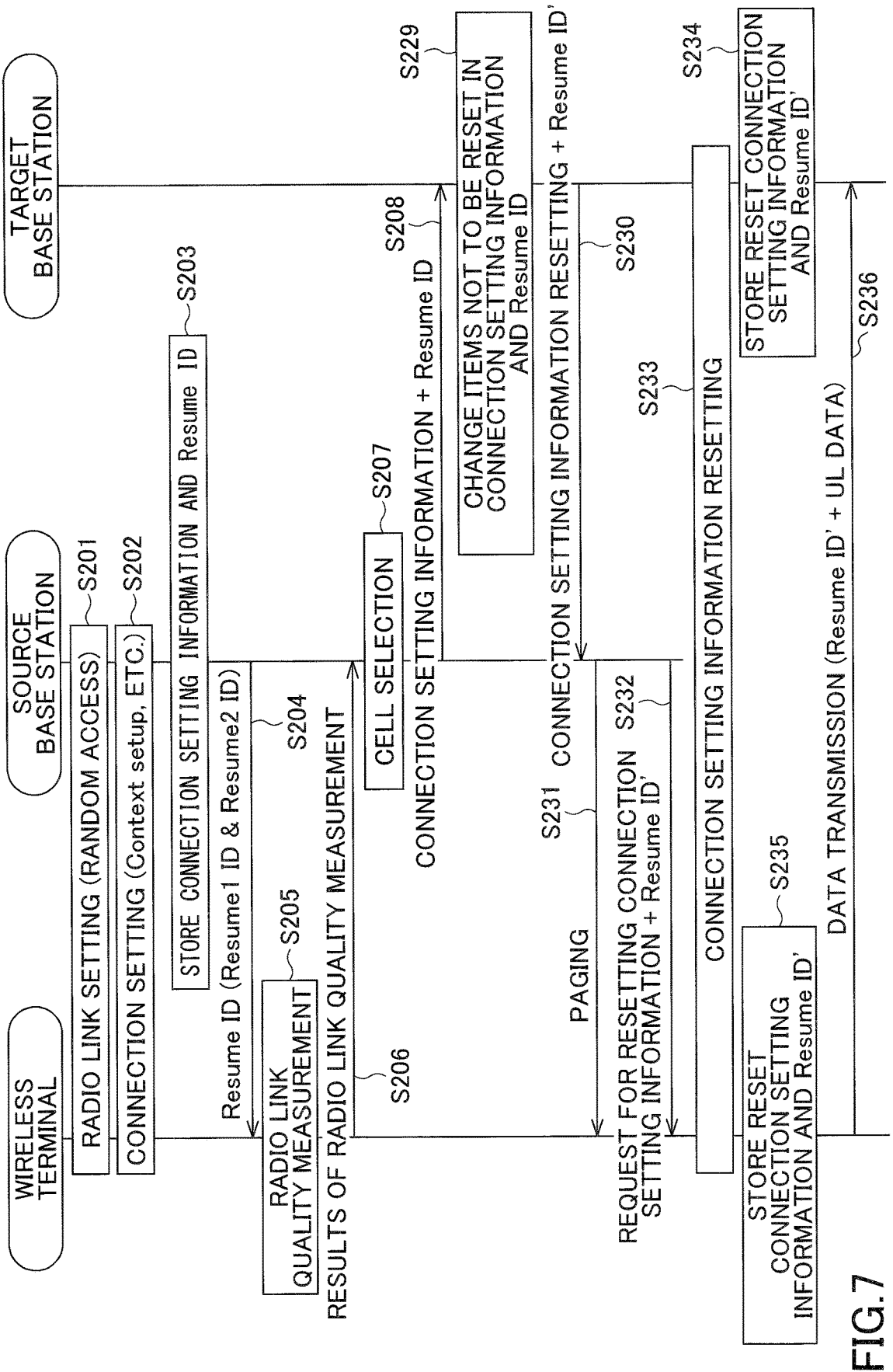
FIG. 7 is a sequence chart of a wireless communication process that includes a resume setting change process according to another example.

FIG. 7 is a sequence chart of a wireless communication process that includes a resume setting change process in the case of (2) and ((b2) or (b3)). Note that the sequence illustrated in FIG. 7 differs from the sequence illustrated in FIG. 6 in a process of Steps S229 and thereafter. Therefore, in the following, the process of Steps S229 and thereafter will be described.

After Step S208, the target base station determines whether or not it is necessary to change the radio link setting, the upper-layer connection setting, and the resume ID. Then, assume that the target base station has determined that it is necessary to execute a resetting process for at least one of the upper-layer connection setting and the radio link setting. In this case, the target base station changes information items that do not need to be reset in the connection setting information. Furthermore, the target base station changes the resume ID assigned to the wireless terminal 12 to a resume ID'. Then, the target base station stores the changed connection setting information together with the resume ID' after the change (Step S229). Further, the target base station transmits a notice of the connection resetting and the resume ID' after the change to the source base station (Step S230). Thereafter, the source base station executes a paging process with respect to the wireless terminal 12 to call the wireless terminal 12 (Step S231). After having called the wireless terminal 12, the source base station transmits a notice of the resume ID' after the change and a request for resetting the connection setting information to the wireless terminal 12 (Step S232).

After the connection setting information has been reset on the wireless terminal 12, the target base station and the wireless terminal 12 together with the upper-layer node 13 reset the connection setting information (Step S233). Note that if the resetting request includes a request for resetting the upper-layer connection setting information, the target base station and the wireless terminal 12 execute a connection setting process that includes upper-layer connection settings such as Context setup. On the other hand, if the resetting request includes a request for resetting the radio link setting information, the target base station and the wireless terminal 12 execute a random access procedure to update the radio link setting information. Then, the target base station stores the updated changed connection setting information together with the resume ID' after the change (Step S234). Also, the target base station may transmit the changed upper-layer connection setting information and resume2 ID' to the upper-layer node 13.

The wireless terminal 12 stores the changed connection setting information together with the transmitted resume ID' after the change (Step S235).

Thereafter, when resuming communication in an inactive state, the wireless terminal 12 reconnects to the radio link using the stored connection setting information, and transmits to the target base station uplink data to the other communication device together with the resume ID' after the change (Step S236). At this time, the wireless terminal 12 and the target base station may execute line setting in the event of communication resumption, for example, according to the method described in Non-Patent Document 1. Then, the source base station, the target base station, and the wireless terminal 12 terminate the wireless communication process. Note that in this sequence, Steps S207 to S235 are included in the resume setting change process. Also, in this sequence, as in the sequence illustrated in FIG. 6, instead of Steps S205-S207, the wireless terminal 12 may determine to change the destination cell, select the changed destination cell, and transmit a notice of the identification information of the selected cell to the source base station. Also, according to a modified example, instead of causing the source base station to transmit a notice of the resume ID' after the change to the wireless terminal 12 at Step S232, the target base station may transmit a notice of the resume ID' after the change to the wireless terminal 12 after Step S233.

Next, a resume setting change process for the case of (3), namely, the case where the resume2 ID or the upper-layer connection setting cannot be maintained, will be described.

The case of (3) occurs, for example, when there is an occurrence of addition, change, or deletion of a service given to and received by the wireless terminal 12, or when a change occurs in the load state of the base station 11, and as a result, it becomes necessary to change the system information, such as, for example, a setting related to f-OFDM.

Figure 8:
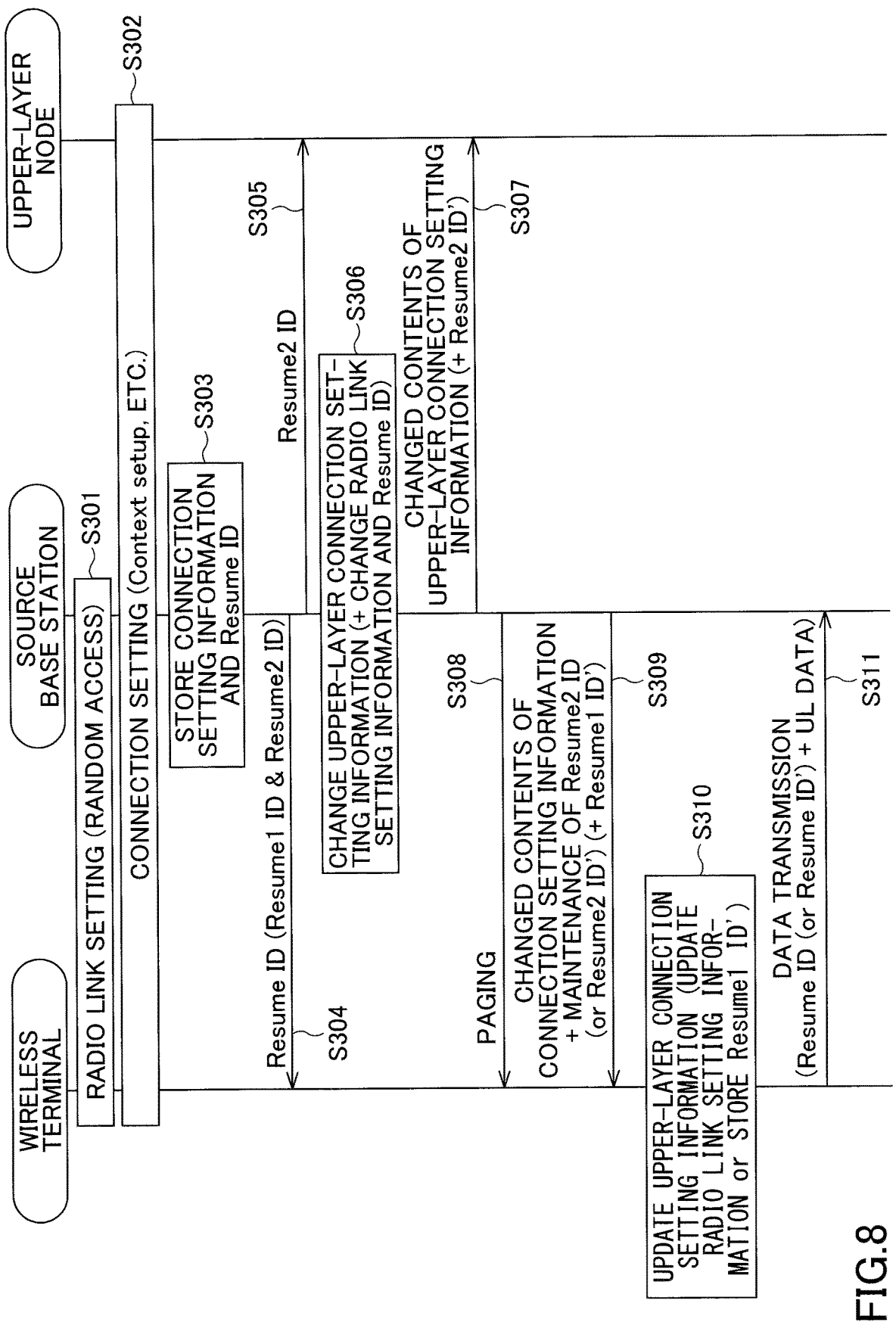
FIG. 8 is a sequence chart of a wireless communication process that includes a resume setting change process according to another example.

FIG. 8 is a sequence chart of a wireless communication process that includes a resume setting change process in the case of (3) and (a). The base station 11 and the wireless terminal 12 execute a radio link setting process, for example, according to a random access procedure (Step S301).

Also, the base station 11, the wireless terminal 12, and the upper-layer node 13 execute a line setting process that includes upper-layer connection settings such as Context setup (Step S302). The base station 11 assigns a resume1 ID to the radio link setting information; assigns a resume2 ID to the upper-layer connection setting information; and stores the resume ID together with the connection setting information (Step S303). Then, the base station 11 transmits a notice of the resume ID (including the resume1 ID and the resume2 ID) to the wireless terminal 12 (Step S304). In this case, the base station 11 may transmit the notice of the resume ID through, for example, PDCCH or PDSCH. Also, the base station 11 transmits the resume2 ID to the upper-layer node 13 (Step S305). Then, the upper-layer node 13 stores the upper-layer connection setting information and the resume2 ID. Also, the wireless terminal 12 stores the transmitted resume ID together with the connection setting information set in the process of Steps S301 and S302.

Thereafter, after the wireless terminal 12 has transitioned from a connected state to an inactive state, if a situation arises where it is necessary to change the upper-layer connection setting information, the base station 11 changes the upper-layer connection setting information (Step S306). Also, if the change in the upper-layer connection setting information necessitates changes in the radio link setting information and the resume1 ID, the base station 11 also changes the radio link setting information and the resume1 ID. Then, the base station 11 transmits the changed contents in the upper-layer connection setting information to the upper-layer node 13 (Step S307).

After having changed the connection setting information, the base station 11 executes a paging process with respect to the wireless terminal 12 to call the wireless terminal 12 (Step S308). After having called the wireless terminal 12, the base station 11 transmits a notice of the changed contents in the upper-layer connection setting information together with maintenance of the resume2 ID, to the wireless terminal 12 (Step S309). Note that instead of the maintenance of the resume2 ID, the base station 11 may transmit a notice of the resume2 ID that has been already set to the wireless terminal 12. Further, if the radio link setting information has also been changed, the base station 11 also transmits a notice of the changed contents in the radio link setting information to the wireless terminal 12. Similarly, if the resume1 ID has also been changed, the base station 11 also transmits a notice of the resume1 ID' after the change to the wireless terminal 12.

The wireless terminal 12 updates the upper-layer connection setting information according to the transmitted changed contents (Step S310). Further, if having received a notice of the changed contents in the radio link setting information or the resume1 ID' after the change, the wireless terminal 12 updates the radio link setting information or stores the resume1 ID' after the change.

Thereafter, when resuming communication in an inactive state, the wireless terminal 12 reconnects to the radio link using the stored connection setting information, and transmits to the base station 11 uplink data to the other communication device together with the resume ID (Step S311). At this time, the wireless terminal 12 and the base station 11 may execute line setting in the event of communication resumption, for example, according to the method described in Non-Patent Document 1. Note that in this example, the resume ID includes the resume2 ID that is not changed, and the resume1 ID that is not changed or a resume1 ID' after the change. Then, the base station 11, the wireless terminal 12, and the upper-layer node 13 terminate the wireless communication process. Note that in this sequence, Steps S306 to S310 are included in the resume setting change process.

Note that according to a modified example, the upper-layer connection setting information and the resume2 ID may be managed on the upper-layer node 13. In this case, at Step S303, the upper-layer node 13 may assign a resume2 ID to the wireless terminal 12. Also, at Step S306, the upper-layer node 13 may change the upper-layer connection setting information. Also, at Step S307, the upper-layer node 13 may transmit a notice of the changed upper-layer connection setting information to the base station 11.

Further, according to another modified example, if the change in the upper-layer connection setting information necessitates resetting the radio link setting information, the base station 11 may issue at Step S309 a request for resetting the radio link setting information to the wireless terminal 12. Then, prior to Step S310, the base station 11 and the wireless terminal 12 may execute a random access procedure to reset the radio link setting information.

Also in the case of (3) and (b1), a resume setting change process may be executed according to the same sequence as illustrated in FIG. 8. In this case, at Step S306, the base station 11 also changes the resume2 ID to a resume2 ID', and at Step S307, transmits a notice of the resume2 ID' after the change together with the changed contents in the upper-layer connection setting information, to the upper-layer node 13. Further, at Step S309, the base station 11 transmits a notice of the changed contents in the upper-layer connection setting information together with the changed resume2 ID', to the wireless terminal 12. At Step S310, the wireless terminal 12 stores the transmitted changed upper-layer connection setting information together with the resume2 ID' after the change. Then, at Step S311, the wireless terminal 12 transmits uplink data to the base station 11 together with the resume ID' after the change that includes the resume2 ID'.

Figure 9:
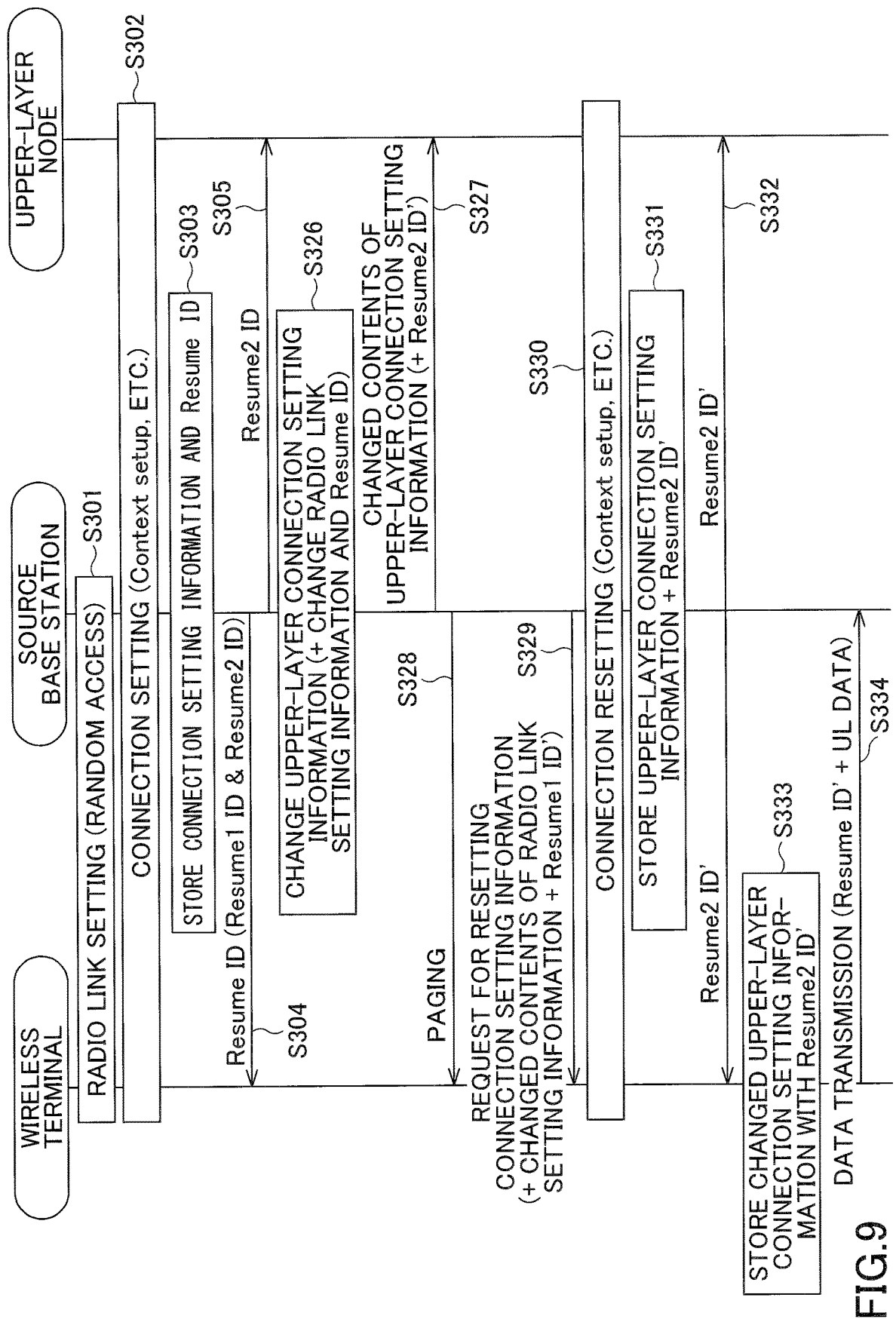
FIG. 9 is a sequence chart of a wireless communication process that includes a resume setting change process according to another example.

FIG. 9 is a sequence chart of a wireless communication process that includes a resume setting change process in the case of (3) and ((b2) or (b3)). Note that the sequence illustrated in FIG. 9 differs from the sequence illustrated in FIG. 8 in a process of Steps S326 and thereafter. Therefore, in the following, the process of Steps S326 and thereafter will be described.

After the wireless terminal 12 has transitioned from a connected state to an inactive state, assume that a situation arises where it is necessary to reset at least a part of the upper-layer connection setting information with the wireless terminal 12, and to change the resume2 ID. In this case, the base station 11 changes information items that do not need to be reset in the upper-layer connection setting information (Step S326). Also, if the change in the upper-layer connection setting information necessitates changing the radio link setting information and the resume1 ID, the base station 11 also changes the radio link setting information and the resume1 ID. Then, the base station 11 transmits the changed contents in the upper-layer connection setting information and the resume2 ID to the upper-layer node 13 (Step S327).

After having changed the connection setting information, the base station 11 executes a paging process with respect to the wireless terminal 12 to call the wireless terminal 12 (Step S328). After having called the wireless terminal 12, the base station 11 requests the wireless terminal 12 to reset the connection setting information (Step S329). At this time, if the radio link setting information has been changed, the base station 11 also transmits a notice of the changed radio link setting information to the wireless terminal 12. Similarly, if the resume1 ID has been changed, the base station 11 also transmits a notice of the resume1 ID' after the change to the wireless terminal 12. Then, the base station 11, the wireless terminal 12, and the upper-layer node 13 execute again a line setting process including upper-layer connection settings such as Context setup (Step S330). Then, the base station 11 changes the resume2 ID to the resume2 ID' and stores the resume2 ID' together with the changed upper-layer connection setting information (Step S331). Also, the base station 11 transmits a notice of the resume2 ID' after the change to the upper-layer node 13 and the wireless terminal 12 (Step S332).

The wireless terminal 12 stores the transmitted changed resume2 ID' together with the changed upper-layer connection setting information (Step S333). Also, if having received a notice of the changed contents or the resume1 ID' after the change of the radio link setting information, the wireless terminal 12 also stores the changed radio link setting information or the resume1 ID' after the change.

Thereafter, when resuming communication in an inactive state, the wireless terminal 12 reconnects to the radio link using the stored connection setting information, and transmits to the base station 11 uplink data to the other communication device together with the resume ID' after the change (Step S334). At this time, the wireless terminal 12 and the base station 11 may execute line setting in the event of a communication resumption, for example, according to the method described in Non-Patent Document 1. Note that in this example, the resume ID' after the change includes the resume2 ID' after the change, and the resume1 ID that is not changed or the resume1 ID' after the change. Then, the base station 11, the wireless terminal 12, and the upper-layer node 13 terminate the wireless communication process. Note that in this sequence, Steps S326 to S333 are included in the resume setting change process.

Also in this case, if the change in the upper-layer connection setting information necessitates resetting the radio link setting information, the base station 11 may issue at Step S329 a request for resetting the radio link setting information to the wireless terminal 12. Then, prior to Step S330 or after Step S330, the base station 11 and the wireless terminal 12 may execute a random access procedure to reset the radio link setting information.

Next, a resume setting change process for the case of (4), namely, the case where the cell that is connected to or camped on by the wireless terminal 12 is changed to a cell provided by another base station that is connected to an upper-layer node different from the upper-layer node 13 connected to the base station 11, will be described.

The case of (4) occurs, for example, under conditions similar to those under which the case of (2) occurs. However, the case of (4) occurs when an upper-layer node connected to the target base station that provides a cell as the changed connection destination differs from an upper-layer node connected to the source base station.

Note that in the following description, an upper-layer node connected to the source base station (e.g., the upper-layer node 13) is referred to as the source upper-layer node, and an upper-layer node connected to the target base station is referred to as the target upper-layer node.

Figure 10:
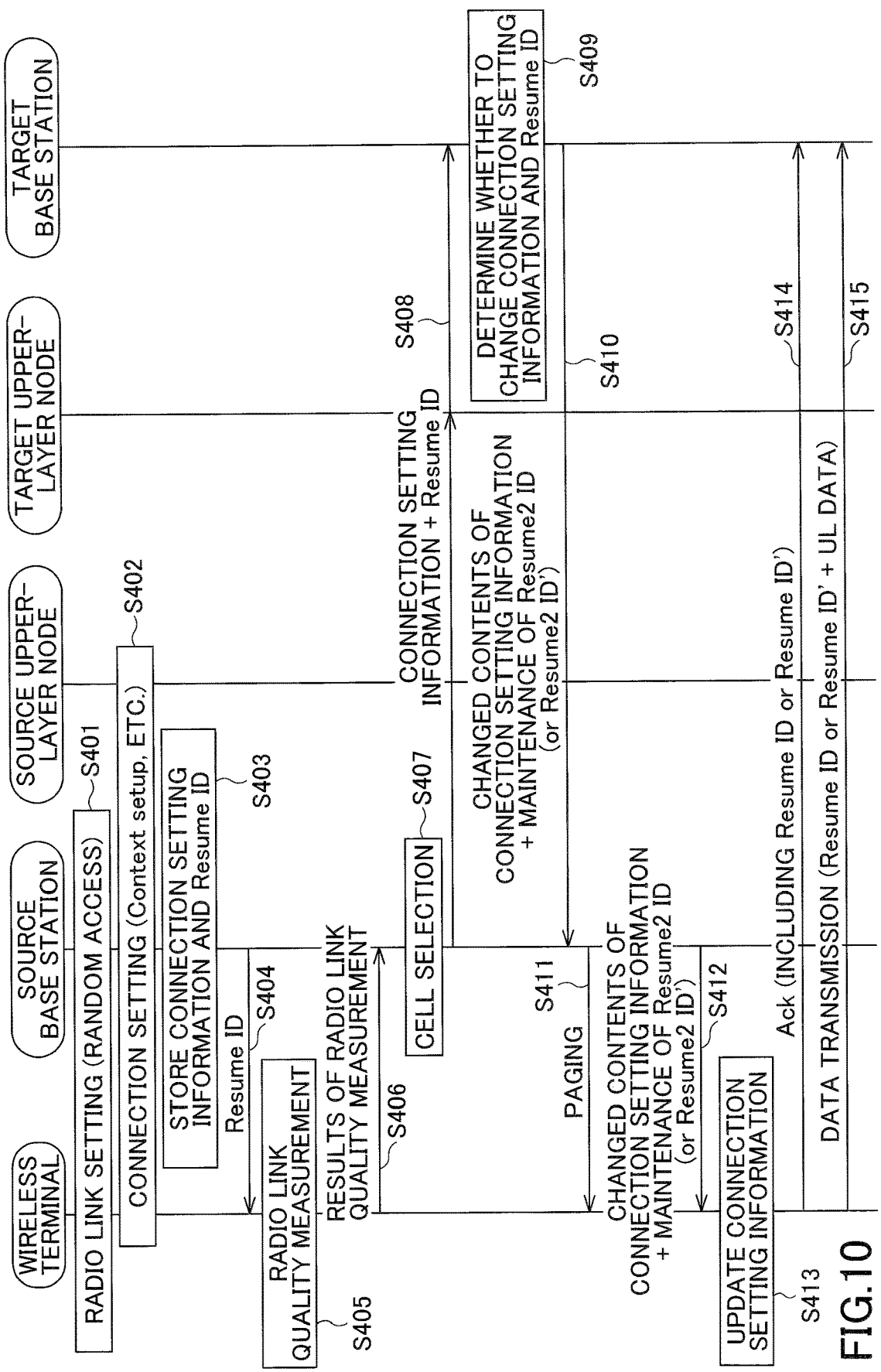
FIG. 10 is a sequence chart of a wireless communication process that includes a resume setting change process according to another example.

FIG. 10 is a sequence chart of a wireless communication process that includes a resume setting change process in the case of (4) and (a). The source base station and the wireless terminal 12 execute a radio link setting process, for example, according to a random access procedure (Step S401).

Also, the source base station, the wireless terminal 12, and the source upper-layer node execute a line setting process that includes upper-layer connection settings such as Context setup (Step S402). Then, the source base station assigns a resume1 ID to the radio link setting information for the wireless terminal 12; assigns a resume2 ID to the upper-layer connection setting information; and stores the radio link setting information, the upper-layer connection setting information, and the resume ID (Step S403). Then, the source base station transmits a notice of the resume ID (including the resume1 ID and the resume2 ID) to the wireless terminal 12 (Step S404). In this case, the source base station may transmit the notice of the resume ID, for example, through PDCCH or PDSCH. Also, the source base station may transmit the upper-layer connection setting information and the resume2 ID to the source upper-layer node. Then, the source upper-layer node stores the upper-layer connection setting information and the resume2 ID. Also, the wireless terminal 12 stores the transmitted resume ID together with the connection setting information set in the process of Steps S401 and S402.

The wireless terminal 12 measures radio link quality not only for a cell used for connection to the source base station, but also for cells provided by the other base stations (Step S405). Then, the wireless terminal 12 transmits a measurement report that includes results of the radio link quality measurement to the source base station (Step S406).

After the wireless terminal 12 has transitioned from a connected state to an inactive state, if a situation arises where it is necessary to change the cell that is connected to or camped on by the wireless terminal 12, the source base station selects a cell that is to be connected to or camped on by the wireless terminal 12 (Step S407). At this time, the source base station may, for example, refer to the results of the radio link quality measurement received from the wireless terminal 12, to select, for example, a cell with the best radio link quality or a cell with the radio link quality satisfying a predetermined condition from among the cells as the cell to be connected. Then, the source base station transmits a notice of the radio link setting information, the resume1 ID, the upper-layer connection setting information, and the resume2 ID with respect to the wireless terminal 12, to the target base station that provides the cell as the changed connection destination through the target upper-layer node (Step S408).

The target base station determines whether or not it is necessary to change the radio link setting, the upper-layer connection setting, and the resume ID (Step S409). Then, the target base station determines whether or not any change has been made in each of the upper-layer connection setting information and the radio link setting information, and whether or not any change has been made with the resume1 ID and/or the resume2 ID. Then, if any change has been made in each of the upper-layer connection setting information and the radio link setting information, the target base station stores the changed contents. Also, the target base station changes the resume1 ID to a resume1 ID' if necessary. Note that in this case, the target base station does not change the resume2 ID. Then, if any change has been made in the radio link setting information and the upper-layer connection setting information, the target base station transmits a notice of the changed contents in the connection setting information (Step S410). Furthermore, if the resume1 ID has been changed to a resume1 ID', the target base station transmits a notice of the resume1 ID' after the change to the source base station. In addition, the target base station also transmits a notice of the maintenance of the resume2 ID to the source base station. Note that if there is no change in the upper-layer connection setting information, the target base station may transmit a notice of the no change together with the maintenance of the resume2 ID to the source base station. Also, the target base station may transmit the changed upper-layer connection setting information and the resume2 ID to the target upper-layer node.

In response to receiving the notice of the changed contents in the connection setting information and the maintenance of the resume2 ID, the source base station executes a paging process with respect to the wireless terminal 12 to call the wireless terminal 12 (Step S411). After having called the wireless terminal 12, the source base station transmits a notice of the changed contents in the upper-layer connection setting information and the maintenance of the resume2 ID to the wireless terminal 12 (Step S412). Note that instead of the maintenance of the resume2 ID, the source base station may transmit a notice of the resume2 ID that has been already set, to the wireless terminal 12. Further, if the radio link setting information has also been changed, the source base station also transmits a notice of the changed contents in the radio link setting information to the wireless terminal 12. Similarly, if the resume1 ID has also been changed, the source base station also transmits a notice of the resume1 ID' after the change to the wireless terminal 12. Note that the radio link setting information to be transmitted may include information on a cell that is provided by the target base station and is to be connected to or camped on by the wireless terminal 12.

Then, the wireless terminal 12 updates the upper-layer connection setting information and the like according to the transmitted changed contents and stores the updated upper-layer connection setting information and the like together with the resume ID (Step S413). Also, the wireless terminal 12 transmits an Ack signal acknowledging that the connection setting information has been changed to the target base station by using the changed connection setting information (Step S414). The Ack signal includes, for example, the resume ID. The Ack signal may further include the changed contents in the connection setting information or the changed connection setting information received by the wireless terminal 12.

Thereafter, when resuming communication in an inactive state, the wireless terminal 12 reconnects to the radio link using the stored connection setting information, and transmits to the target base station uplink data to the other communication device together with the resume ID (Step S415). At this time, the wireless terminal 12 and the target base station may execute line setting in the event of communication resumption, for example, according to the method described in Non-Patent Document 1. Then, the respective base stations, the respective upper-layer nodes, and the wireless terminal 12 terminate the wireless communication process. Note that in this sequence, Steps S407 to S414 are included in the resume setting change process. Also, instead of Steps S405 to S407, the wireless terminal 12 may determine to change the destination cell, select the changed destination cell, and transmit a notice of the identification information of the selected cell to the source base station. Further, the process of Step S414 may be omitted.

Note that, according to a modified example, the upper-layer connection setting information and the resume2 ID may be managed on the upper-layer node. In this case, at Step S403, the source upper-layer node may assign a resume2 ID to the wireless terminal 12. Also, at Step S408, the source base station issues a command to the source upper-layer node to transmit a notice of the upper-layer connection setting information and the resume2 ID to the target upper-layer node, and the source upper-layer node transmits the notice of the upper-layer connection setting information and the resume2 ID to the target upper-layer node. Then, at Step S409, the target upper-layer node determines whether to change each of the upper-layer connection setting information and the resume2 ID. Also, at Step S410, the target upper-layer node transmits a notice of the changed contents in the upper-layer connection setting information to the source base station through the source upper-layer node.

Also in the case of (4) and (b1), a resume setting change process may be executed according to substantially the same sequence as illustrated in FIG. 10. In this case, if the target base station determines at Step S409 that it is necessary to change the resume2 ID, the target base station changes the resume2 ID to a resume2 ID'. Then, at Step S410, the target base station simply needs to transmit a notice of the changed contents in the upper-layer connection setting information together with the resume2 ID' after the change to the source base station. Similarly, at Step S412, the source base station simply needs to transmit a notice of the changed upper-layer connection setting information together with the resume2 ID' after the change to the wireless terminal 12. Then, the wireless terminal 12 simply needs to transmit at Step S414 an Ack signal that includes the resume2 ID' after the change, and at Step S415, to transmit uplink data together with the resume2 ID' after the change to the target base station.

Figure 11:
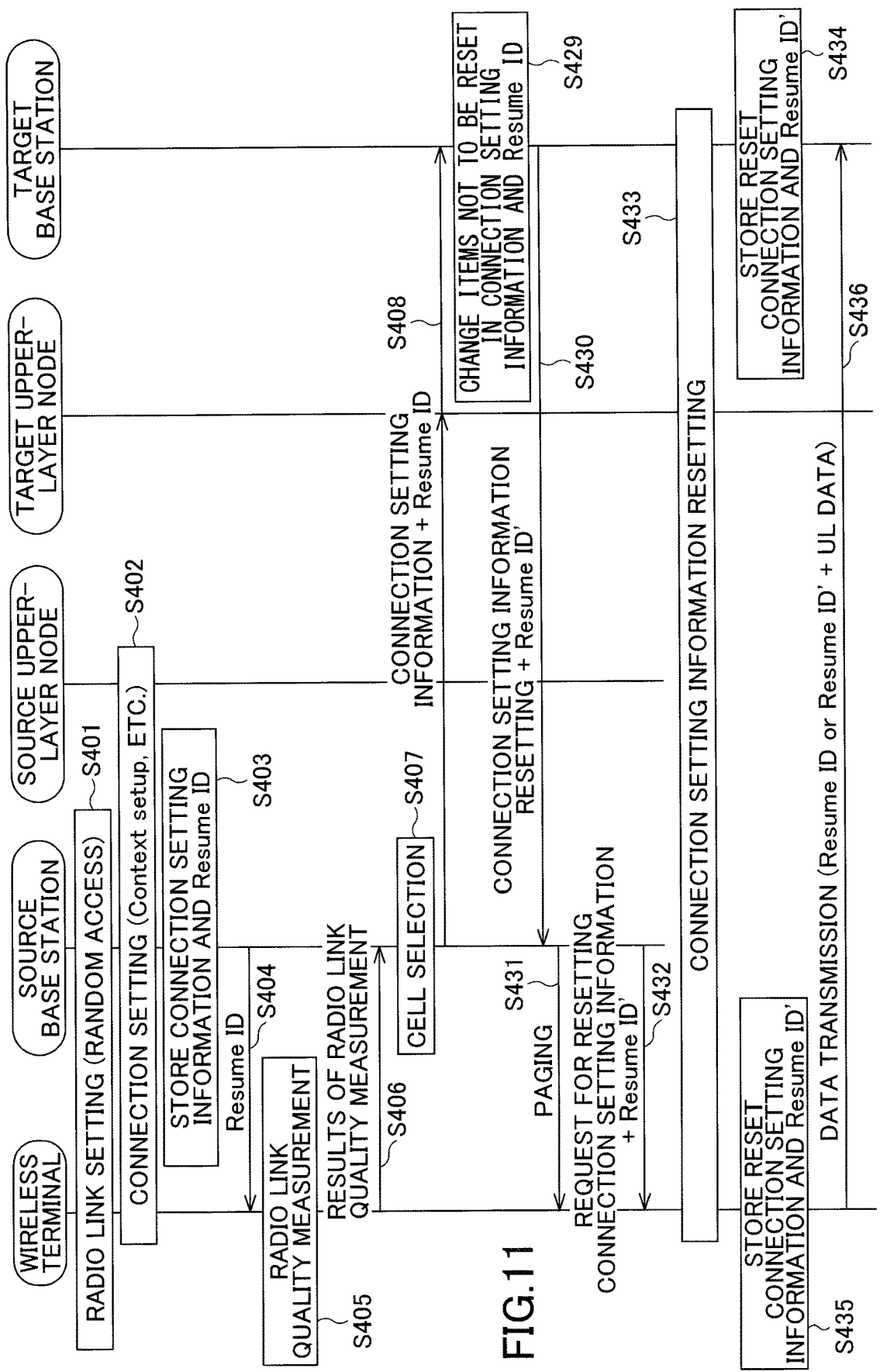
FIG. 11 is a sequence chart of a wireless communication process that includes a resume setting change process according to another example.

FIG. 11 is a sequence chart of a wireless communication process that includes a resume setting change process in the case of (4) and (b2) or (b3). Note that the sequence illustrated in FIG. 11 differs from the sequence illustrated in FIG. 10 in a process of Steps S429 and thereafter. Therefore, in the following, the process of Steps S430 and thereafter will be described.

After having received a notice of the radio link setting, the upper-layer connection setting, and the resume ID, the target base station determines whether or not it is necessary to change the radio link setting, the upper-layer connection setting, and the resume ID (Step S429). Then, assume that the target base station has determined that it is necessary to execute resetting at least one of the upper-layer connection setting and the radio link setting. In this case, the target base station changes information items that do not need to be reset in the connection setting information. Further, the target base station changes the resume2 ID assigned to the wireless terminal 12 to a resume2 ID'. Also, if it is necessary to change the resume1 ID assigned to the wireless terminal 12, the target base station changes the resume1 ID to a resume1 ID'. Then, the target base station transmits a notice of the line resetting information and the resume ID' after the change (including at least the resume2 ID') to the source base station (Step S430).

Thereafter, the source base station executes a paging process with respect to the wireless terminal 12 to call the wireless terminal 12 (Step S431). After having called the wireless terminal 12, the source base station transmits a notice of the resume ID' after the change and a request for resetting the connection setting information to the wireless terminal 12 (Step S432).

After the connection setting information has been reset on the wireless terminal 12, the target base station, the target upper-layer node, and the wireless terminal 12 reset the connection setting information (Step S433). Note that if the resetting request includes a request for resetting the upper-layer connection setting information, the target base station, the target upper-layer node, and the wireless terminal 12 execute a line setting process that includes upper-layer connection settings such as Context setup. On the other hand, if the resetting request includes a request for resetting the radio link setting information, the target base station and the wireless terminal 12 execute a random access procedure to update the radio link setting information. Then, the target base station stores the updated changed connection setting information together with the resume ID' after the change (Step S434). Also, the target base station may transmit the changed upper-layer connection setting information and the resume2 ID' to the target upper-layer node.

The wireless terminal 12 stores the reset connection setting information together with the transmitted resume ID' after the change (Step S435).

Thereafter, when resuming communication in an inactive state, the wireless terminal 12 reconnects to the radio link using the stored connection setting information, and transmits to the target base station uplink data to the other communication device together with the resume ID' after the change (Step S436). At this time, the wireless terminal 12 and the target base station may execute line setting in the event of communication resumption, for example, according to the method described in Non-Patent Document 1. Then, the respective base stations, the respective upper-layer nodes, and the wireless terminal 12 terminate the wireless communication process. Note that in this sequence, Steps S407 to S435 are included in the resume setting change process. Also in this sequence, as in the sequence illustrated in FIG. 10, instead of Steps S405 to S407, the wireless terminal 12 may determine to change the destination cell, select the changed destination cell, and transmit a notice of the identification information of the selected cell to the source base station. Also, according to a modified example, instead of transmitting a notice of the resume ID' after the change at Step S432 by the source base station to the wireless terminal 12, after Step S433, the target base station may transmit a notice of the resume ID' after the change to the wireless terminal 12.

Figure 12:
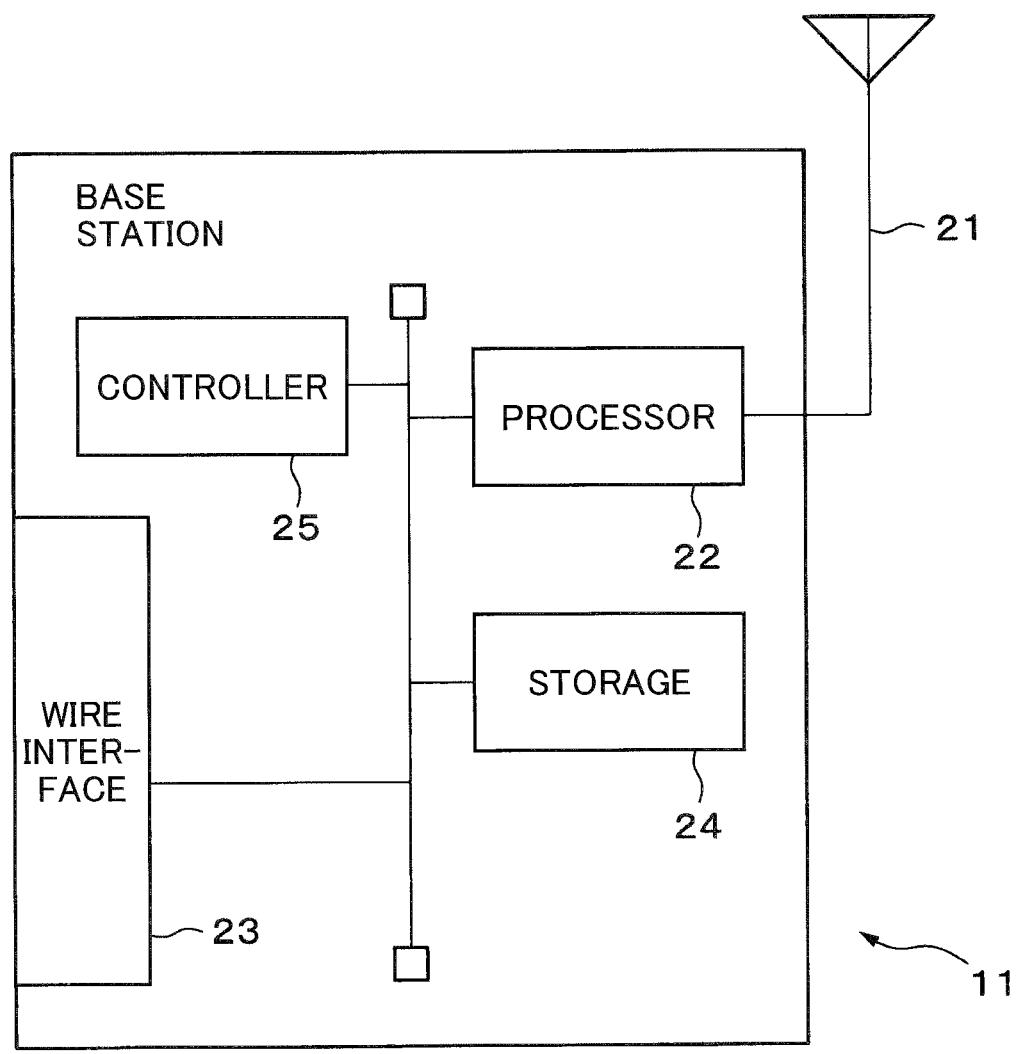
FIG. 12 is a schematic configuration diagram of a base station.

FIG. 12 is a schematic configuration diagram of the base station 11. The base station 11 includes an antenna 21, a processor 22, a wire interface 23, a storage 24, and a controller 25. The processor 22, the storage 24, and the controller 25 are formed as separate circuits. Alternatively, these units may be implemented in the base station 11 as one or more integrated circuits in which circuits corresponding to these units are integrated.

The antenna 21 transmits a downlink signal transmitted through the processor 22, as a wireless signal. Also, the antenna 21 receives a wireless signal that includes an uplink signal from the wireless terminal 12 to convert the wireless signal into an electrical signal, and transmits the electrical signal as the uplink signal to the processor 22. The antenna 21 may have a transmitting antenna and a receiving antenna separately.

The processor 22 converts a downlink signal received from the controller 25 into an analog signal to be superimposed with a carrier wave having a wireless frequency specified by the controller 25. Then, the processor 22 amplifies the downlink signal superimposed with the carrier wave to a desired level by a high-power amplifier (not illustrated) and transfers the downlink signal to the antenna 21.

The processor 22 also amplifies an uplink signal received from the antenna 21 with a low-noise amplifier (not illustrated). The processor 22 multiplies the amplified uplink signal by a periodic signal having an intermediate frequency, to convert the frequency of the uplink signal from a wireless frequency into a baseband frequency. Then, the processor 22 applies an analog-to-digital conversion to the uplink signal having the baseband frequency, and then, transfers the converted signal to the controller 25.

The wire interface 23 includes a communication interface circuit for connecting the base station 11 to the upper-layer node 13 and the other base stations. In addition, the wire interface 23 analyzes a signal received from the upper-layer node 13 according to the S1 interface, to extract a downlink signal and a control signal included in the received signal. Further, the wire interface 23 analyzes a signal received from another base station according to the X2 interface, to extract a control signal (e.g., connection setting information or changed contents thereof, or a resume ID) included in the received signal. The wire interface 23 transfers the extracted downlink signal and control signal to the controller 25.

Meanwhile, the wire interface 23 converts an uplink signal received from the controller 25 to a signal in a format according to the S1 interface, and outputs the converted signal to the upper-layer node 13. The wire interface 23 also converts a control signal (e.g., connection setting information or changed contents thereof, or a resume ID) to be transmitted to another base station into a format according to the X2 interface. Then, the wire interface 23 outputs the control signal to the other base station.

The storage 24 includes, for example, a non-volatile semiconductor memory or a volatile semiconductor memory that is rewritable. The storage 24 stores various information items for communicating with the wireless terminal 12, various information items transmitted or received by the base station 11, and various programs that run on the base station 11. In the present embodiment, the storage 24 stores information on the resume function of a wireless terminal connected to the base station 10 itself, namely, the upper-layer connection setting information, the radio link setting information, the resume1 ID, and the resume2 ID.

The controller 25 includes, for example, one or more processors and peripheral circuits. The controller 25 modulates and multiplexes downlink signals according to modulation and multiplexing schemes adopted in a communication standard with which the wireless communication system 1 is compliant. The controller 25 then transfers the modulated and multiplexed downlink signals to the processor 22. The controller 25 modulates and multiplexes downlink signals, for example, according to f-OFDM.

Meanwhile, the controller 25 demultiplexes an uplink signal received from the processor 22 according to the modulation and multiplexing schemes adopted in the communication standard with which the wireless communication system 1 is compliant, to demodulate each of the demultiplexed received signals. The controller 25 demultiplexes and demodulates an uplink signal, for example, according to f-OFDM. The controller 25 then outputs the demodulated uplink signals to the wire interface 23. Further, the controller 25 extracts, from the demodulated uplink signals, various signals to be referred to by the base station 11, such as control information on call control, or communication quality measurement information on the wireless terminal 12.

The controller 25 also executes various processes for executing wireless communication, such as transmission power control and call control. Further, the controller 25 attaches a resume1 ID to radio link setting information obtained by executing a radio link setting process for the wireless terminal 12. The controller 25 also attaches a resume2 ID to upper-layer connection setting information obtained by executing a line setting process for the wireless terminal 12.

Further, the controller 25 executes control for changing at least one of the radio link setting information and the resume1 ID when a condition that requires a change is met with respect to at least one of the radio link setting information and the resume1 ID that have been set for the wireless terminal 12. Similarly, the controller 25 executes control for changing at least one of the upper-layer connection setting information and the resume2 ID when a condition that requires a change is met with respect to at least one of the upper-layer connection setting information and the resume2 ID that have been set for the wireless terminal 12.

For example, as described above, the controller 25 may determine whether or not such a condition that requires a change is met, based on the load state of the base station 11 itself; whether a service provided to the wireless terminal 12 has been changed; whether the QoS has changed; whether the system information has been changed; and the like. Then, once having determined that a condition that requires a change is met, the controller 25 changes at least one of the connection setting information, which is one of the radio link setting information and the upper-layer connection setting information corresponding to the met condition, and the resume ID (resume1 ID or resume2 ID) corresponding to the met condition. At this time, the controller 25 may change the connection setting information and/or the resume ID according to one of the sequences illustrated in FIGS. 2 to 11. Then, the controller 25 generates, for example, a downlink signal that includes the changed contents of the connection setting information and/or the changed resume ID, to transmit the signal to the wireless terminal 12 through the processor 22 and the antenna 21. Alternatively, the controller 25 transmits, for example, a control signal that includes the changed contents in the connection setting information and/or the changed resume ID to the upper-layer node 13 or another base station through the wire interface 23. The controller 25 also executes controlling when the wireless terminal 12 in an inactive state resumes communication using the connection setting information.

Figure 13:
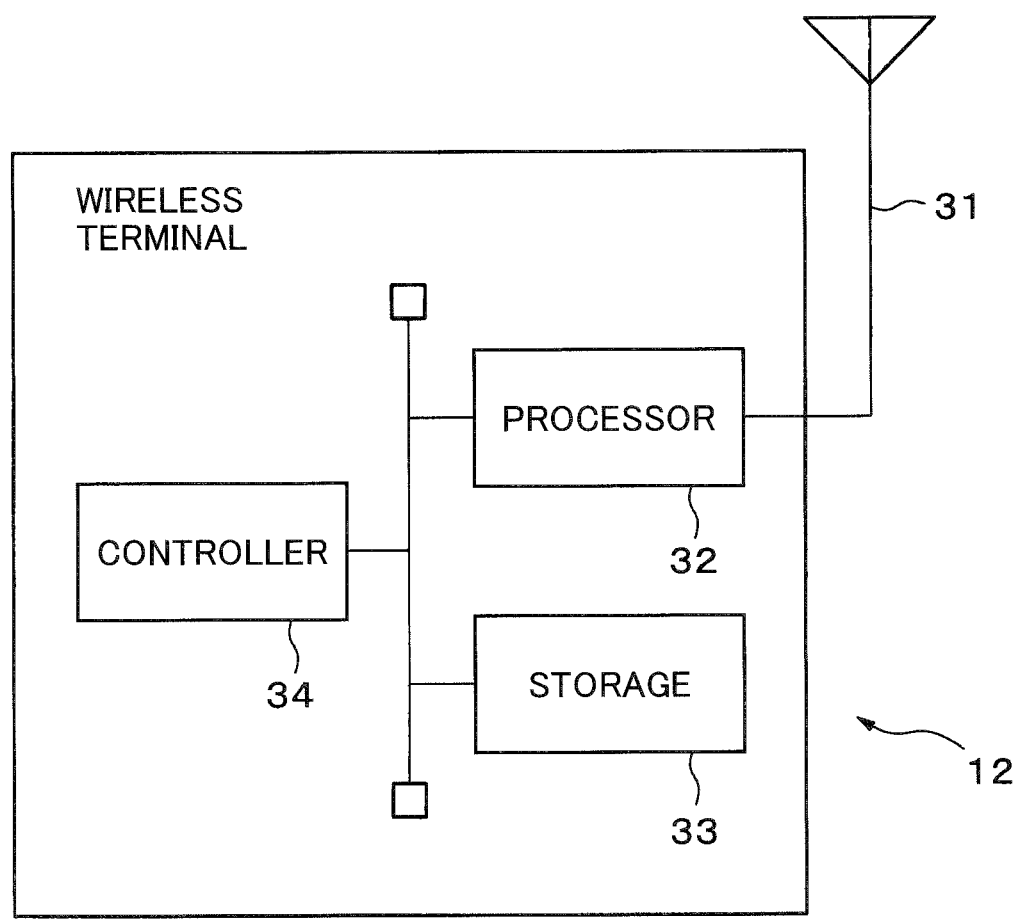
FIG. 13 is a schematic configuration diagram of a wireless terminal.

FIG. 13 is a schematic configuration diagram of a wireless terminal 12. The wireless terminal 12 includes an antenna 31, a processor 32, a storage 33, and a controller 34. The wireless terminal 12 may further include one or more of a user interface such as a touch panel (not illustrated), a microphone (not illustrated), a speaker (not illustrated), and a camera (not illustrated). The wireless terminal 12 may further include a GPS (Global Positioning System) receiver (not illustrated) to measure the position of the wireless terminal 12. The processor 32, the storage 33, and the controller 34 are formed as separate circuits. Alternatively, these units may be implemented in the wireless terminal 12 as one or more integrated circuits in which circuits corresponding to these units are integrated.

The antenna 31 transmits an uplink signal transmitted through the processor 32, as a wireless signal. The antenna 31 also receives a wireless signal from the base station 11, converts the wireless signal into an electrical signal to form a downlink signal, and transmits the downlink signal to the processor 32. The antenna 31 may have a transmitting antenna and a receiving antenna separately.

The processor 32 converts an uplink signal received from the controller 34 into an analog signal to be superimposed with a carrier wave having a wireless frequency specified by the controller 34. Then, the processor 32 amplifies the downlink signal superimposed with the carrier wave to a desired level by a high-power amplifier (not illustrated) and transmits the downlink signal to the antenna 31.

The processor 32 also amplifies a downlink signal received from the antenna 31 with a low-noise amplifier (not illustrated). The processor 32 multiplies the amplified downlink signal by a periodic signal having an intermediate frequency, to convert the frequency of the downlink signal from a wireless frequency into a baseband frequency. Then, the processor 32 applies an analog-to-digital conversion to the downlink signal having the baseband frequency, and then, transfers the converted signal to the controller 34.

The storage 33 includes, for example, a non-volatile semiconductor memory or a volatile semiconductor memory that is rewritable. The storage 33 stores various information items for communicating with the base station 11, various information items transmitted or received by the wireless terminal 12, and various programs that run on the wireless terminal 12. The storage 33 further stores information on the resume function, namely, the radio link setting information, the upper-layer connection setting information, the resume1 ID, and the resume2 ID.

The controller 34 includes, for example, one or more processors and peripheral circuits. The controller 34 modulates and multiplexes uplink signals according to modulation and multiplexing schemes adopted in the communication standard with which the wireless communication system 1 is compliant. The controller 34 then transfers the modulated and multiplexed uplink signals to the processor 32. The controller 34 modulates and multiplexes uplink signals, for example, according to a multiplexing scheme compliant with f-OFDMA.

Meanwhile, the controller 34 demultiplexes a downlink signal received from the processor 32 according to the modulation and multiplexing schemes adopted in the communication standard with which the wireless communication system 1 is compliant, to demodulate each of the demultiplexed received signals. The controller 34 demultiplexes and demodulates a downlink signal, for example, according to f-OFDM. The controller 34 then extracts various control information or data items included in the demodulated received signals. The controller 34 then executes a process depending on the extracted control information or data items. For example, if the downlink signal includes an audio signal, the controller 34 reproduces the audio signal through a speaker. Also, if the downlink signal includes a video signal, the controller 34 reproduces the video signal through a touch panel.

The controller 34 further executes various processes for executing wireless communication with the base station 11, such as a connection request process.

The controller 34 also executes processes related to the resume function, for example, a process of transitioning from a connected state to an inactive state or vice versa; a process of resuming communication using the radio link setting information when the wireless terminal 12 is in an inactive state; and the like. Further, when a change occurs in one of the radio link setting information, the upper-layer connection setting information, and the resume ID, the controller 34 changes at least one of the radio link setting information, the upper-layer connection setting information, and the resume ID according to one of the sequences illustrated in FIGS. 2 to 11.

As described above, this wireless communication system separates information on the resume function into radio link setting information and upper-layer connection setting information, and manages each of the radio link setting information and the upper-layer connection setting information by attaching individual identification information. Then, when a situation arises where a change is required for the radio link setting information or the upper-layer connection setting information when the wireless terminal is in an inactive state, the base station transmits a notice of the changed contents in the connection setting information to the wireless terminal, or resets the connection setting information together with the wireless terminal. This allows the wireless communication system to change the connection setting information maintained for the wireless terminal while the wireless terminal has transitioned to an inactive state to suspend communication. Therefore, in this wireless communication system, even if the connection setting information maintained for the wireless terminal that has transitioned to an inactive state to suspend communication is changed, the changed connection setting information can be used, and thereby, the procedure for resuming communication executed by the wireless terminal can be simplified.

Note that according to a modified example, a mapping table representing a relationship between the resume1 ID and the radio link setting information may be stored in advance in the base station and in the wireless terminal. Then, if the radio link setting information or the resume1 ID is changed according to one of the sequences illustrated in FIGS. 2 to 11, instead of transmitting a notice of the changed contents in the radio link setting information, the base station simply needs to transmit a notice of the resume1 ID corresponding to the changed radio link setting information to the wireless terminal. Also, when resetting the radio link setting information, the base station and the wireless terminal can identify the resume1 ID corresponding to the reset radio link setting information by referring to the mapping table.

Similarly, a mapping table representing a relationship between the resume2 ID and the upper-layer connection setting information may be stored in advance in the base station and in the wireless terminal. Then, if the upper-layer connection setting information or the resume2 ID is changed according to one of the sequences illustrated in FIGS. 2 to 11, instead of transmitting a notice of the changed contents in the upper-layer connection setting information, the base station simply needs to transmit a notice of the resume2 ID corresponding to the changed upper-layer connection setting information to the wireless terminal 12. Also, when resetting the upper-layer connection setting information, the base station and the wireless terminal can identify the resume2 ID corresponding to the reset radio link setting information by referring to the mapping table.

Note that the mapping table representing the relationship between the resume1 ID and the radio link setting information and the mapping table representing the relationship between the resume2 ID and the upper-layer connection setting information may be installed in the base station and in the wireless terminal, for example, at the time of factory shipment. Alternatively, the mapping table representing the relationship between the resume1 ID and the radio link setup information and the mapping table representing the relationship between the resume2 ID and the upper-layer connection setup information may be installed in the base station when the base station is installed. Then, the wireless terminal may receive these mapping tables from the base station when executing the radio link setting and the upper-layer connection setting with the base station. According to this modified example, even if a change occurs in the connection setting information, the wireless communication system does not need to transmit the changed contents in the connection setting information between the base station and the wireless terminal, and hence, the communication traffic volume can be reduced in the event of a change in the connection setting information.

Further, the base station may transmit a notice of the changed connection setting information itself instead of transmitting a notice of the changed contents in the connection setting information to the wireless terminal or another base station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A base station comprising:
a memory;
a processor configured to transmit a wireless signal to a wireless terminal and to receive a wireless signal from the wireless terminal; and
a controller, wherein
when a cell to which the wireless terminal is connected is to be changed to another cell in a state where a radio link between the wireless terminal and the base station is disconnected and an upper-layer connection between the base station and an upper-layer node is maintained, the controller transmits setting information for setting the upper-layer connection to the wireless terminal through the processor; and
the upper-layer connection is used by the wireless terminal for communication via the base station.

2. The base station as claimed in claim 1, wherein when identification information for identifying the setting information is changed in the state where the radio link is disconnected and the upper-layer connection is maintained, the controller transmits the identification information to the wireless terminal through the processor.

3. The base station as claimed in claim 2, further comprising:
an interface for connecting to another base station and the upper-layer node,
wherein the controller receives the setting information from said another base station or the upper-layer node through the interface.

4. The base station as claimed in claim 1, wherein when the setting information is to be reset between the wireless terminal and the base station in the state where the radio link is disconnected and the upper-layer connection is maintained, the controller makes a request for resetting the setting information to the wireless terminal through the processor, and updates the setting information by the resetting.

5. The base station as claimed in claim 1, wherein when the setting information is to be reset among the base station, the wireless terminal, and the upper-layer node in the state where the radio link is disconnected and the upper-layer connection is maintained, the controller makes a request for resetting the setting information to the wireless terminal through the processor, and updates the setting information by the resetting.

6. The base station as claimed in claim 1, further comprising:
an interface for connecting to another base station and the upper-layer node,
wherein the controller receives the setting information from said another base station or the upper-layer node through the interface.

7. A wireless communication system, comprising:
a base station; and
a wireless terminal,
wherein when a cell to which the wireless terminal is connected is to be changed to another cell in a state where a radio link between the wireless terminal and the base station is disconnected and an upper-layer connection between the base station and an upper-layer node is maintained, the base station transmits setting information for setting the upper-layer connection to the wireless terminal, the upper-layer connection being used by the wireless terminal for communication via the base station; and
wherein in the state where the radio link is disconnected and the upper-layer connection is maintained, the wireless terminal reconnects to the radio link based on the setting information to communicate with another communication device.

8. A wireless terminal comprising:
a memory;
a processor configured to transmit a wireless signal to a base station and to receive a wireless signal from the base station; and
a controller, wherein
when a cell to which the wireless terminal is connected is to be changed to another cell in a state where a radio link between the wireless terminal and the base station is disconnected and an upper-layer connection between the base station and an upper-layer node is maintained, the controller receives setting information for setting the upper-layer connection through the processor, and reconnects to the radio link based on the received setting information to transmit a wireless signal that includes a signal to another communication device to the base station through the processor; and
the upper-layer connection is used by the wireless terminal for communication via the base station.

* * * * *